US008625963B2

(12) United States Patent
Hiyama

(10) Patent No.: US 8,625,963 B2
(45) Date of Patent: Jan. 7, 2014

(54) VIDEO REPRODUCTION LIMITING METHOD AND VIDEO REPRODUCING APPARATUS

(75) Inventor: Takashi Hiyama, Ohtawara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1244 days.

(21) Appl. No.: 11/914,117

(22) PCT Filed: Nov. 1, 2005

(86) PCT No.: PCT/JP2005/020113
§ 371 (c)(1),
(2), (4) Date: Nov. 9, 2007

(87) PCT Pub. No.: WO2006/120768
PCT Pub. Date: Nov. 16, 2006

(65) Prior Publication Data
US 2009/0092373 A1  Apr. 9, 2009

(30) Foreign Application Priority Data

May 11, 2005  (JP) .................................. 2005-139091

(51) Int. Cl.
*H04N 5/92* (2006.01)

(52) U.S. Cl.
USPC ........................................................ 386/248

(58) Field of Classification Search
USPC ........................................................ 386/248
See application file for complete search history.

(56) References Cited

U.S. PATENT DOCUMENTS

| 5,559,550 A | 9/1996 | Mankovitz | |
|---|---|---|---|
| 6,351,596 B1 | 2/2002 | Ostrover | |
| 6,356,704 B1* | 3/2002 | Callway et al. | 386/252 |
| 6,564,005 B1* | 5/2003 | Berstis | 386/239 |
| 6,895,170 B1* | 5/2005 | Lambert et al. | 386/248 |
| 7,474,834 B2* | 1/2009 | Lambert et al. | 386/248 |
| 7,593,620 B2* | 9/2009 | Surcouf et al. | 386/343 |
| 7,739,706 B2 | 6/2010 | Gonzales-Caiazzo et al. | |
| 7,739,707 B2* | 6/2010 | Sie et al. | 725/25 |
| 2002/0001448 A1 | 1/2002 | Jeong | |
| 2002/0146239 A1* | 10/2002 | Hamasaka et al. | 386/95 |
| 2002/0194592 A1* | 12/2002 | Tsuchida et al. | 725/32 |
| 2003/0061606 A1* | 3/2003 | Hartwig et al. | 725/25 |
| 2004/0103434 A1* | 5/2004 | Ellis | 725/58 |
| 2005/0120373 A1* | 6/2005 | Thomas et al. | 725/58 |
| 2008/0212949 A1* | 9/2008 | Wachtfogel et al. | 386/124 |

FOREIGN PATENT DOCUMENTS

| CN | 1172397 A | 2/1998 |
|---|---|---|
| EP | 1 134 972 A2 | 9/2001 |
| GB | 2 346 251 A | 8/2000 |
| JP | 8-203246 A | 8/1996 |

(Continued)

*Primary Examiner* — Teshome Hailu
(74) *Attorney, Agent, or Firm* — Birch, Stewart, Kolasch & Birch, LLP

(57) ABSTRACT

A video player for limiting the view by a viewer not satisfying the view allowance condition allowing a young person to view a specific video. When a limited video viewing of which by a viewer not satisfying a view allowance condition is limited by limiting the broadcast time zone, e.g., by limiting the broadcast time zone to the midnight of when the young people are asleep is recorded, the video player inhibits reproduction of the limited video in a time zone other than the time zone from the recording start time of the limited video to a predetermined time. Since the limited video can be reproduced only in the time zone from the originally broadcast time to a predetermined time, any viewer not satisfying the view allowance condition is prevented from viewing a limited video.

12 Claims, 14 Drawing Sheets

(56) References Cited

FOREIGN PATENT DOCUMENTS

| | | |
|---|---|---|
| JP | 11-150707 A | 6/1999 |
| JP | 2000-115725 A | 4/2000 |
| JP | 2000-217092 A | 8/2000 |
| JP | 2002-149884 A | 5/2002 |
| JP | 2002-343019 A | 11/2002 |
| JP | 2003-524959 A | 8/2003 |
| JP | 2003-264828 A | 9/2003 |
| JP | 2004-207808 A | 7/2004 |
| JP | 2004-229235 A | 8/2004 |
| JP | 2005-86483 A | 3/2005 |
| WO | WO 98/01995 | 1/1998 |
| WO | WO 99/04561 | 1/1999 |
| WO | WO 02/078329 A1 | 10/2002 |

* cited by examiner

VIDEO REPRODUCTION LIMITING METHOD AND VIDEO REPRODUCING APPARATUS

TECHNICAL FIELD

The invention relates to a video reproduction limiting method for limiting reproduction of a video needed to be limited in viewing by a viewer not satisfying a view allowance condition (mainly, age) to view a specific video, and a video reproducing apparatus that realizes such a method.

BACKGROUND ART

Recently, by various methods, for movies, television broadcasts, recording medium such as an optical disc, and distribution through the Internet, it is possible to view various kinds of videos at home, more specifically in his/her room. Such a video may contain scenes of violent or sexual content, that are desirable to be limited in viewing mainly by a young person. Usually, because the target necessary to be limited in viewing for such a video (hereinafter, referred to as "limited video") is a young person, the age of a visitor to a movie theater may be limited when the limited video is shown in the movie theater. Further, for a recording medium recorded with the limited video, the age of a purchaser may be limited at a shop. However, because a viewer cannot be theoretically limited from viewing the television broadcasts, a time period for broadcasting the limited videos is limited to the middle of the night in many cases.

Further, adding information about limiting in viewing to a video itself, or more specifically to the data of a video, has been partly adopted. For example, Patent Document 1 discloses a technique in which a television receiver automatically skips a limited portion by using the information added to the video where the limited portion to be limited in viewing is contained in the video being broadcasted. Further, Patent Document 2 discloses a technique in which a video is reproduced while skipping the limited portion where the limited portion is contained in the video recorded in the recording medium.
Patent Document 1:
Japanese Patent Application Laid-Open No. 2000-217092
Patent Document 2:
Japanese Patent Application Laid-Open No. 2003-524959

DISCLOSURE OF THE INVENTION

Problems to be Solved by the Invention

However, in recent years, a video recording/reproducing apparatus capable of recording a broadcasted video on a magnetic recording medium or a recording medium such as an optical disc, and reproducing it later is wide spread. There is a problem that reproducing a video without any limitation may be possible, though it is a limited video, where the video was recorded using such a video recording/reproducing apparatus. For example, even though the broadcasting time period is limited for the limited video to the middle of the night, when young people are asleep, the young people who are not supposed to view such a limited video can view such a limited video during daytime when it is recorded by a so-called timer recording function. Further, though the function to limit the reproduction of the video with which the reproducing apparatus is equipped is canceled by a method of some sort, they may be able to freely view the recorded limited video.

The present invention is made in view of the above consideration, and the main object is to provide a video reproduction limiting method and a video reproducing apparatus capable of surely limiting viewing of a video to be limited in viewing by a viewer such as a young person not satisfying a view allowance condition to view a specific video (a limited video) when it is necessary to be limited, and not limiting it when it is not necessary to be limited.

Means for Solving the Problems

In the present invention, plainly, reproduction of a video that is recorded during a specific time period, for example, the middle of the night can be reproduce only during the specific time period. Therefore, it is possible to prevent a viewer such as a young person not satisfying a view allowance condition to view the specific video from viewing the specific video that is recorded during the specific time period, during a time period other than the specific time period, or force him/her to view the video with a deteriorated image quality.

According to the invention, a video reproduction limiting method of limiting reproduction of a limited video needed to be limited in viewing by a viewer not satisfying a condition to view a specific video using a video reproducing apparatus for reproducing a recorded video is characterized by comprising: allowing the video reproducing apparatus to reproduce a limited video during a time period from a recording start clock time of the recorded limited video to a predetermined clock time; and inhibiting reproduction of the limited video by the video reproducing apparatus during a time period other than the time period.

Further, according to the invention, a video reproduction limiting method of limiting reproduction of a limited video needed to be limited in viewing by a viewer not satisfying a condition to view a specific video using a video reproducing apparatus for reproducing a recorded video is characterized by comprising: setting a specific time period of a day to the video reproducing apparatus; allowing the video reproducing apparatus to reproduce a video during the specific time period, the video being recorded during the specific time period; and inhibiting reproduction of the video by the video reproducing apparatus during a time period other than the specific time period.

Further, according to the invention, a video reproducing apparatus including reproducing means for reproducing a video recorded in a recording medium for recording a broadcasted video and a recording start clock time of the video, the video reproducing apparatus is characterized by comprising: means for allowing the reproducing means to reproduce a limited video during a time period from a recording start clock time of the limited video to a predetermined clock time, the limited video being needed to be limited in viewing by a viewer not satisfying a condition to view a specific video among videos recorded in the recording medium, and inhibiting the reproducing means from reproducing the limited video during a time period other than the time period.

Further, according to the invention, a video reproducing apparatus including recording means for recording a broadcasted video, means for recording a recording start clock time of the video, and reproducing means for reproducing the video recorded by the recording means, the video reproducing apparatus characterized by comprising: means for allowing the reproducing means to reproduce a limited video during a time period from the recording start clock time of the limited video to a predetermined clock time, the limited video being needed to be limited in viewing by a viewer not satisfying a view allowance condition to view a specific video among videos recorded by the recording means, and inhibiting the reproducing means to reproduce the limited video during a time period other than the time period.

In the video reproduction limiting method and the video reproducing apparatus according to the invention as mentioned above, when a limited video to be limited in viewing by a viewer such as a young person not satisfying the view allowance condition to view a specific video is recorded, the limited video is inhibited from being reproduced during a time period other than a time period from a recording start clock time to a predetermined clock time.

Further, according to the invention, in the invention of the video reproducing apparatus mentioned above, the video reproducing apparatus is characterized by comprising: content information output means for outputting content information indicative of content of one or more videos recorded by the recording means; and means for allowing the content information output means to output the content information of the limited video during a time period from the recording start clock time of the limited video recorded by the recording means to the predetermined clock time, and inhibiting the content information output means from outputting the content information With the video reproducing apparatus according to such an invention, in the invention of the video reproducing apparatus mentioned above, when content information such as a thumbnail showing content of the recorded video is outputted, an output of the content information is inhibited for the limited video during a time period other than the time period from the recording start clock time to the predetermined clock time.

Further, according to the invention, in the invention of the video reproducing apparatus mentioned above, the video reproducing apparatus is characterized by comprising: means for causing the recording means to record other video while recording the limited video, the other video being broadcasted in parallel with the limited video on another channel other than a channel on which the limited video is broadcasted, upon recording the limited video being broadcasted; and means for causing the content information output means to output the content information of the other video during a time period other than the time period from the recording start clock time of the limited video to the predetermined clock time, the limited video being recorded by the recording means, and the other video being recorded by the recording means together with the limited video.

With the video reproducing apparatus according to such an invention, in the invention of the video reproducing apparatus mentioned above, content information of the other video recorded in parallel with the limited video may be outputted instead of outputting the content information of the limited video during a time period other than the time period from the recording start clock time of the limited video to the predetermined clock time.

Further, according to the invention, in the invention of the video reproducing apparatus mentioned above, the video reproducing apparatus is characterized in that the recording means is configured to record a video on a predetermined recording medium after encoding the video; and the video reproducing apparatus further comprising means for causing the recording means to encode the other video by a compression ratio higher than a compression ratio by which the limited video is encoded.

With the video reproducing apparatus according to such an invention, in the invention of the video reproducing apparatus mentioned above, when the other video is recorded in parallel with the limited video, the other video is encoded with a compression ratio higher than that of the limited video.

Further, according to the invention, the video reproducing apparatus including reproducing means for reproducing a video recorded in a recording medium for recording a broadcasted video and a recording start clock time of the video, the video reproducing apparatus is characterized by comprising: means for setting a specific limiting time period of a day; and means for allowing the reproducing means to reproduce the video during the limiting time period, the limiting time period including the recording start clock time, and inhibiting the reproducing means from reproducing the video during a time period other than the limiting time period.

Further, according to the invention, a video reproducing apparatus including recording means for recording a broadcasted video, and reproducing means for reproducing the video recorded by the recording means, the video reproducing apparatus is characterized by comprising: means for setting a specific limiting time period of a day; and means for allowing the reproducing means to reproduce the video during the limiting time period, the video being recorded by the recording means during the limiting time period, and inhibiting the reproducing means from reproducing the video during a time period other than the limiting time period.

In the video reproducing apparatus according to the invention as mentioned above, the middle of the night when a limited video to be limited in viewing by a viewer such as a young person not satisfying a view allowance condition to view a specific video may be broadcasted is set beforehand as the specific limiting time period, and for a video recorded during this predetermined limiting time period, reproduction may be inhibited during a time period other than the limiting time period.

Further, according to the invention, in the invention of the video reproducing apparatus mentioned above, the video reproducing apparatus is characterized by comprising: content information output means for outputting content information indicative of content of one or more videos recorded by the recording means; and means for allowing the content information output means to output the content information of the video during the limiting time period, the video being recorded by the recording means during the limiting time period, and inhibiting the content information output means from outputting the content information of the video during a time period other than the limiting time period.

With the video reproducing apparatus according to such an invention, in the invention of the video reproducing apparatus mentioned above, for the content information of the video recorded during the limiting time period, when the content information such as a thumbnail showing content of the recorded video is outputted, the output during a time period other than the limiting time period may be inhibited.

Further, according to the invention, a video reproducing apparatus is characterized by comprising: means for causing the reproducing means to reproduce a video that is a degraded video of a limited video in an image quality during a time period other than time period from the recording start clock time of the limited video to the predetermined clock time, the limited video being needed to be limited in viewing by a viewer not satisfying a view allowance condition to view a specific video among videos recorded by the recording means.

With the video reproducing apparatus according to such an invention, when a limited video to be limited in viewing by a viewer such as a young person not satisfying a condition to view a specific video is recorded, such a limited video may be reproduced with a deteriorated image quality, for example, by reducing a red component during a time period other than a time period from a recording start clock time to a predetermined clock time.

Further, according to the invention, a video reproducing apparatus including recording means for recording a broadcasted video, and reproducing means for reproducing the video recorded by the recording means, the video reproducing apparatus characterized by comprising: means for setting a specific limiting time period of a day, and means for causing the reproducing means to reproduce a degraded video during a time period other than the limiting time period, wherein the degraded video is a degraded video of the video in an image quality that is recorded by the recording means during the limiting time period.

With the video reproducing apparatus according to such an invention, in the invention of the video reproducing apparatus mentioned above, when a video is recorded during specific limiting time period such as the middle of the night in which a limited video to be limited in viewing by a viewer such as a young person not satisfying a condition to view a specific video is broadcasted, such a video may be reproduced with a deteriorated image quality by reducing for example, a red component during a time period other than the limiting time period.

Further, according to the invention, in any one of the inventions of the video reproducing apparatus mentioned above, the video reproducing apparatus is characterized by further comprising: clocking means for clocking a time; external clock time information receiving means for receiving external clock time information indicative of an exterior clock time; and
means for synchronizing the clock time clocked by the clocking means with the clock time indicated by the external clock time information received by the external clock time information receiving means.

With the video reproducing apparatus according to such an invention, in any one of the invention of the video reproducing apparatus mentioned above, an internal clock time of the video reproducing apparatus may be synchronized with an exterior clock time based on external clock time information indicative of the exterior clock time.

Effects of the Invention

According to the invention as mentioned above, because reproduction of a limited video is inhibited during a time period other than time period from a recording start clock time of the limited video to a predetermined clock time, though the limited video to be limited in viewing by a viewer not satisfying a view allowance condition to view a specific video is recorded, it is possible to prevent that the viewer not satisfying the view allowance condition to view the limited video because the recorded limited video can be reproduced only during a time period from the recording start clock time i.e., an original broadcast clock time, to the predetermined clock time by limiting periods time for broadcasting the limited video.

Further, according to the invention, because the content information of the limited video is not outputted during any time periods other than the time period from the recording start clock time of the limited video to the predetermined clock time, the viewer cannot recognize that the limited video is recorded, it is possible to surely inhibit the limited video from being reproduced.

Further, according to the invention, because the content information of the other video recorded in parallel with the recording of the limited video is outputted during a time period other than the time period from the recording start clock time of the limited video to the predetermined clock time, a user can check that the limited video is recorded by checking the content information of the other video, though the content information of the limited video is not displayed.

Further, according to the invention, when recording other video in parallel with the recording of the limited video, it is possible to reduce an extra size of the recording medium needed to spare as much as possible by recording while encoding by a compression ratio higher than that of the limited video.

Further, according to the invention, by inhibiting reproduction of a video during a time period other than the limiting time period where the video is recorded during limiting time period such as the middle of the night during which the limited video may be broadcasted, because the recorded limited video can be reproduced only during the limiting time period with which the original broadcast clock time is included, it is possible to prevent a viewer not satisfying a view allowance condition from viewing the limited video though the limited video broadcasted during the limiting time period is recorded.

Further, according to the invention, because content information of the video recorded during the limiting time period with which the limited video may be included is not displayed during any time periods other than the limiting time period, it is possible to surely inhibit the limited video from being reproduced while the viewer not being able to recognize that these videos are recorded.

Further, according to the invention, by degrading the image quality of the limited video being reproduced during a time period other than the time period from the recording start clock time of the limited video to the predetermined clock time, because the influence on which the limited video gives to a viewer may be reduced (for example, color of blood disappears by reducing a red component), it is possible to reduce the influence on the viewer such as a young person not satisfying the view allowance condition who needs to be limited in viewing of the limited video when he/she reproduces the limited video during a time period other than the time period from the recording start clock time of the limited video to the predetermined clock time by mistake.

Further, according to the invention, by degrading the image quality of the video, when the reproduction of a video recorded during limiting time period during which the limited video may be broadcasted, it is possible to reduce the influence on the viewer not satisfying the view allowance condition when he/she mistakenly reproduces the limited video during a time period other than the limiting time period.

Further, according to the invention, by synchronizing an internal clock time of the video reproducing apparatus with an external clock time of the video reproducing apparatus, the present invention exhibits outstanding effects such as being able to correctly control the time period during which the limited video can be reproduced, and surely prevent the viewer not satisfying the view allowance condition from viewing the limited video.

DESCRIPTION OF THE REFERENCE NUMERALS

1 video reproducing apparatus
11 control section
14 clocking section (clocking means)
21 signal processing section
22 drive section
23 tuner section (external clock time information receiving means)
24 output section

PREFERRED EMBODIMENTS FOR EXECUTING THE INVENTION

Hereafter, the invention will be specifically explained based on the drawings showing Embodiments thereof.

Embodiment 1

Figure 1:
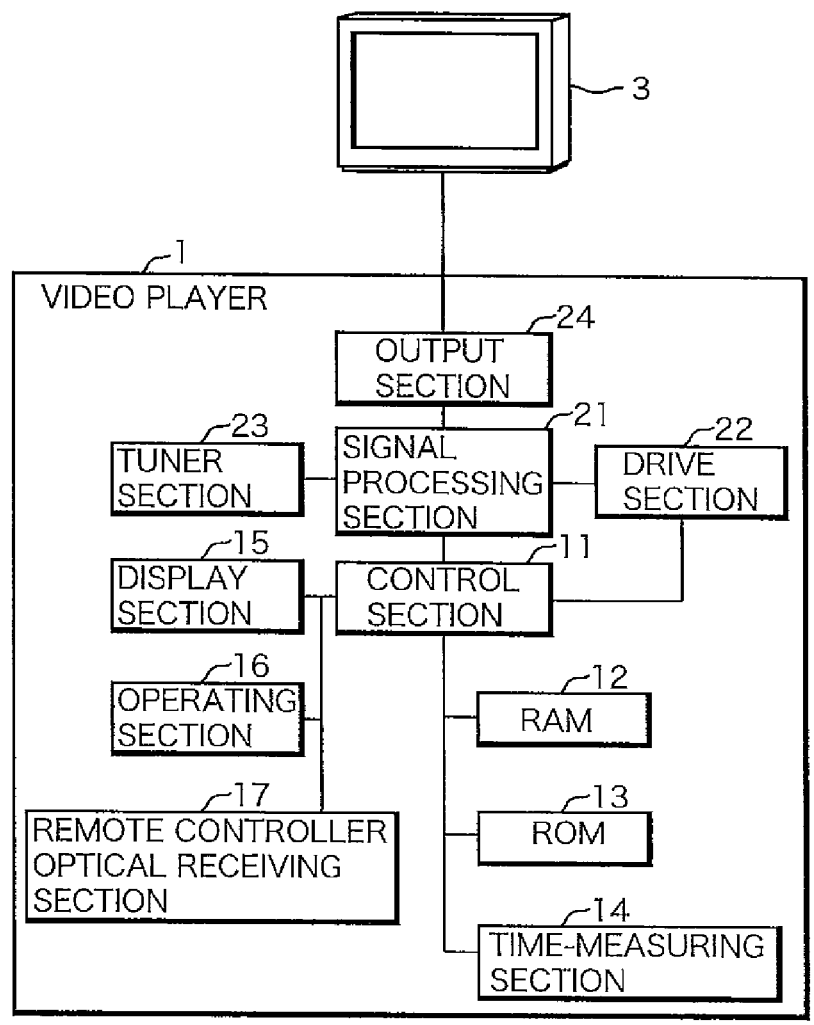
FIG. 1 A block diagram showing an internal configuration example of a video reproducing apparatus according to the invention.

FIG. 1 is a block diagram showing an internal configuration example of a video reproducing apparatus 1 according to Embodiment 1 of the invention.

The video reproducing apparatus 1 according to Embodiment 1 of the invention is provided with a control section 11 that controls an operation of the entire video reproducing apparatus 1. To the control section 11, a RAM 12 that stores various kinds of information required for processes executed by the video reproducing apparatus 1, a ROM 13 that stores control programs for the control section 11 to control the video reproducing apparatus 1, and a clocking section (clocking means) 14 that clocks a clock time inside the video reproducing apparatus 1 are connected. Further, to the control section 11, a display section 15 such as a small sized liquid crystal display for displaying required information, an operating section 16 that accepts an operation by a user, and a remote controller optical receiving section 17 that receives a light signal transmitted from a remote controller (not illustrated) are connected. The remote controller optical receiving section 17 is configured to receive the light signal from the remote controller not shown, and to input the received content into the control section 11. The operating section 16 includes various kinds of switches and buttons operable by the user. When each switch or button of the operating section 16 is operated by the user, a signal respectively assigned to each of them is inputted into the control section 11. In the meantime, the display section 15 and the operating section 16 may also be configured with a touch panel.

Also, to the control section 11, a signal processing section 21 that performs a process and a transmission of a visual signal and an audio signal is connected. To the signal processing section 21, a tuner section 23 that receives various kinds of broadcasting, such as ground-based broadcasting, satellite broadcasting, cable broadcasting, analog broadcasting, and digital broadcasting, is connected. The tuner section 23 receives a broadcasting signal corresponding to a video. The signal processing section 21 performs a signal process such as decoding of the broadcasting signal received by the tuner section 23. Further, the tuner section 23 can receive data for the Electronic Program Guide (EPG) in addition to the broadcasting signal corresponding to the video. Therefore, the video reproducing apparatus 1 can perform a program selection or a program reservation using the received EPG data. Further, the tuner section 23 is configured so that it receives an external clock time as needed, specifically external clock time information indicative of a standard time of an area where the video reproducing apparatus 1 is installed, from data contained in the broadcasting signal, for example and, thus, functioning as external clock time information receiving means. The control section 11 also performs a process to synchronize the clock time inside the video reproducing apparatus 1 (hereinafter, referred to as "internal clock time") clocked by the clocking section 14 with the clock time indicated by the external clock time information received by the tuner section 23.

Further, to the control section 11 and the signal processing section 21, a drive section 22 that records data on and reads-out the data from a recording medium such as an optical disc, a hard disk, a magnetic tape, or a semiconductor memory is connected. The drive section 22 may also be configured so that it records data on and reads-out the data from a hard disk as a built-in recording medium being impossible to be removed to the outside. Further, the drive section 22 may also be configured so that it records and reads-out data when a removable and portable recording medium such as an optical disc, a magnetic tape, or a semiconductor memory card, that is removable to the outside, is loaded. Further, although the single drive section 22 is shown in FIG. 1, the video reproducing apparatus 1 may also be configured to include two or more drive sections 22 such that it includes a hard disk drive and an optical disk drive. In either case, the drive section 22 can record two or more videos in the recording medium within a limit of the storage capacity of the recording medium.

The control section 11 controls operations of the signal processing section 21 and the drive section 22. By this control of the control section 11, the signal processing section 21 processes the broadcasting signal received by the tuner section 23 and encodes it for recording; and the drive section 22 records the data encoded by the signal processing section 21 in the recording medium. Thus, the control section 11, the signal processing section 21, and the drive section 22 function as a recording section or recording means.

Further, to the signal processing section 21, an output section 24 that outputs visual data and audio data to the outside is connected. Usually, to the output section 24, a television receiver 3 using a CRT display or a liquid crystal display is connected. By the control of the control section 11, the drive section 22 reads-out required data from the recording medium, the signal processing section 21 decodes the data read-out by the drive section 22, and the output section 24 outputs the data decoded by the signal processing section 21 to the television receiver 3. The television receiver 3 displays an image on its screen based on the data outputted from the output section 24, and reproduces audio from its speaker. Thus, the control section 11, the signal processing section 21, the drive section 22, and the output section 24 function as reproducing section or reproducing means.

Next, a process performed by the video reproducing apparatus 1 according to Embodiment 1 of the invention having the above-mentioned configuration will be explained. In Embodiment 1, the video reproducing apparatus 1 performs a process to limit reproduction of a limited video that is a video to be limited in viewing by a viewer not satisfying a condition to view a specific video (hereinafter, referred to as "view allowance condition") such as a movie categorized as PG-13 (Parental Guidance 13th) as an example. Specifically, when the limited video broadcasted during the middle of the night in order to limit viewing by a young person is recorded, the video reproducing apparatus 1 allows reproduction of the limited video only during a time period from a recording start clock time at which the recording of the limited video is started to a predetermined clock time. As an end clock time at which the time period during which the limited video can be reproduced ends, a predetermined clock time such as one hour before dawn is designated, and this predetermined clock time is stored in the ROM 13.

Figure 2:
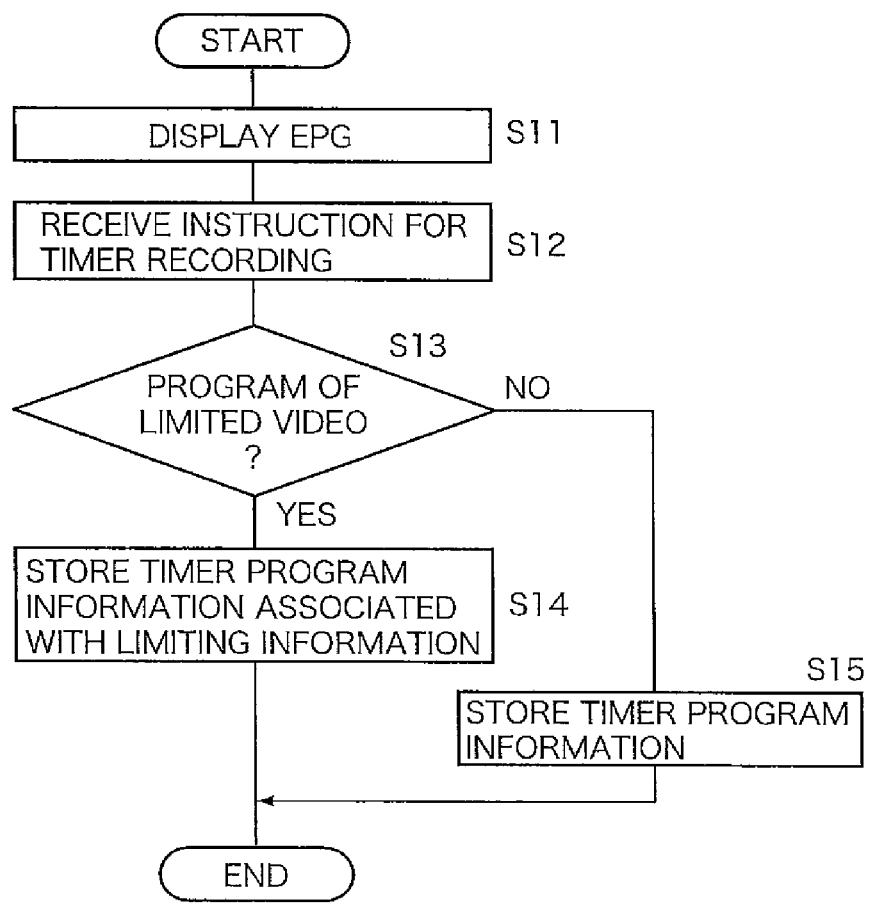
FIG. 2 A flowchart showing a processing procedure when the video reproducing apparatus according to Embodiment 1 executes a reservation for timer recording.

FIG. 2 is a flowchart showing a processing procedure when the video reproducing apparatus 1 according to Embodiment 1 performs a reservation for timer recording, and the control section 11 executes it according to the control program stored in the ROM 13.

The tuner section 23 receives the EPG data as needed, and the control section 11 stores the EPG data received by the tuner section 23 in the RAM 12. The EGP data includes information specifying a broadcast start clock time and a broadcast end clock time of each program being broadcasted on each channel, and further includes information specifying a program of the limited video. In accordance with an acceptance of an instruction by the user operating the operating section 16, or an acceptance of the light signal by the remote controller optical receiving section 17, the control section 11 displays the EPG on the screen of the television receiver 3 by outputting the EPG data stored in the RAM 12 from the output section 24 to the television receiver 3 (S11). A program to be timer-recorded is selected on the screen of the television receiver 3 by the user operating the operating section 16 or the remote controller. Thus, the control section 11 accepts the instruction for the timer recording of the selected program through the operating section 16 or the remote controller optical receiving section 17 (S12).

The control section 11 then determines based on the EPG data stored in the RAM 12 whether the program on which the instruction for the timer recording has been accepted is a program of the limited video (S13). When the program on which the instruction for the timer recording has been accepted is a program of the limited video (S13: YES), the control section 11 stores in the RAM 12 timer program information specifying the program on which the instruction for the timer recording has been accepted associating with limiting information specifying that the program is a program of the limited video (S14), and terminates the process. When the program on which the instruction for the timer recording has been accepted is not a program of the limited video (S13: NO), the control section 11 stores in the RAM 12 only the timer program information specifying the program on which the instruction for the timer recording has been accepted without performing the process of Step S14 (S15), and terminates the process.

In the processing procedure shown in FIG. 2 above, although the process performing a reservation for timer recording using the EPG has been shown, the reservation for timer recording may be performed by other methods such as a method using G-code. Further, in place of determining whether the program to be timer-recorded is a program of the limited video based on the EPG data, the information specifying whether the program on which the instruction for the timer recording has been accepted is a program of the limited video may be inputted to the video reproducing apparatus 1, by the user operating the operating section 16 or the remote controller.

Figure 3:
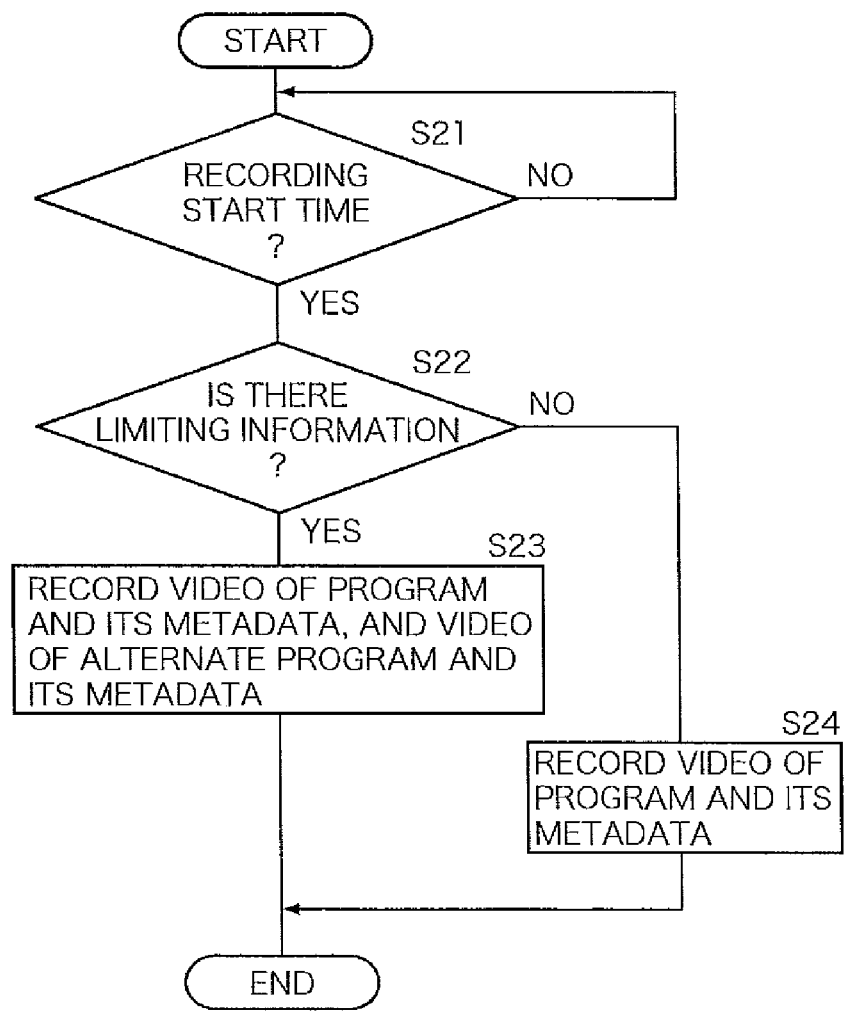
FIG. 3 A flowchart showing a processing procedure when the video reproducing apparatus according to Embodiment 1 records a video.

FIG. 3 is a flowchart showing a processing procedure when the video reproducing apparatus 1 according to Embodiment 1 records a video, and the control section 11 executes it according to the control program stored in the ROM 13.

The control section 11 determines as needed whether it has reached the recording start clock time at which time the recording is specified to be started based on the internal clock time clocked by the clocking section 14 according to the timer program information stored in the RAM 12 (S21). When it is determined that the recording start clock time is not yet reached (S21: NO), the control section 11 continues the determination of whether it has reached the recording start clock time. When it is determined that the recording start clock time is reached (S21: YES), the control section 11 determines whether the limiting information is associated with the timer program information specifying the program to be recorded (S22).

In Step S22, when it is determined that the limiting information is associated with the timer program information (S22: YES), the control section 11 receives the broadcasting signal of the channel specified by the timer program information with the tuner section 23 until the broadcast end clock time, and records the data which has decoded the received broadcasting signal by the signal processing section 21, in a recording medium at the drive section 22. At this time, the video of the program identified by the timer program information is associated with metadata such as the recording start clock time, a recording date, and a program name extracted from the EPG data and the limiting information, and is recorded in the recording medium by the drive section 22. Also, at the same time, the control section 11 records a video of a counterprogram and its metadata being broadcasted in parallel on a channel other than the channel on which the program identified by the timer program information is broadcasted, in a recording medium by the drive section 22 associating with the program identified by the timer program information (S23). In the meantime, the control section 11 causes the signal processing section 21 to encode the video of the counterprogram by a higher compression ratio with respect to a compression ratio of the video of the program identified by the timer program information and encoded by the signal processing section 21, and causes the drive section 22 to record it in the recording medium. In the meantime, the channel of the counterprogram may be set beforehand to a specific channel, for example a channel specialized in educational programs that never broadcasts a program of the limited video, or may be selected at random. However, when selecting the counterprogram at random, it is necessary to select a program that is not a program of the limited video.

In Step S22, when it is determined that the limiting information is not associated with the timer program information (S22: NO), the control section 11 causes the drive section 22 to record only the video and metadata of the program identified by the timer program information in the recording medium (S24). After a process of Step S23 or Step S24 is finished, the control section 11 terminates the process.

Figure 4:
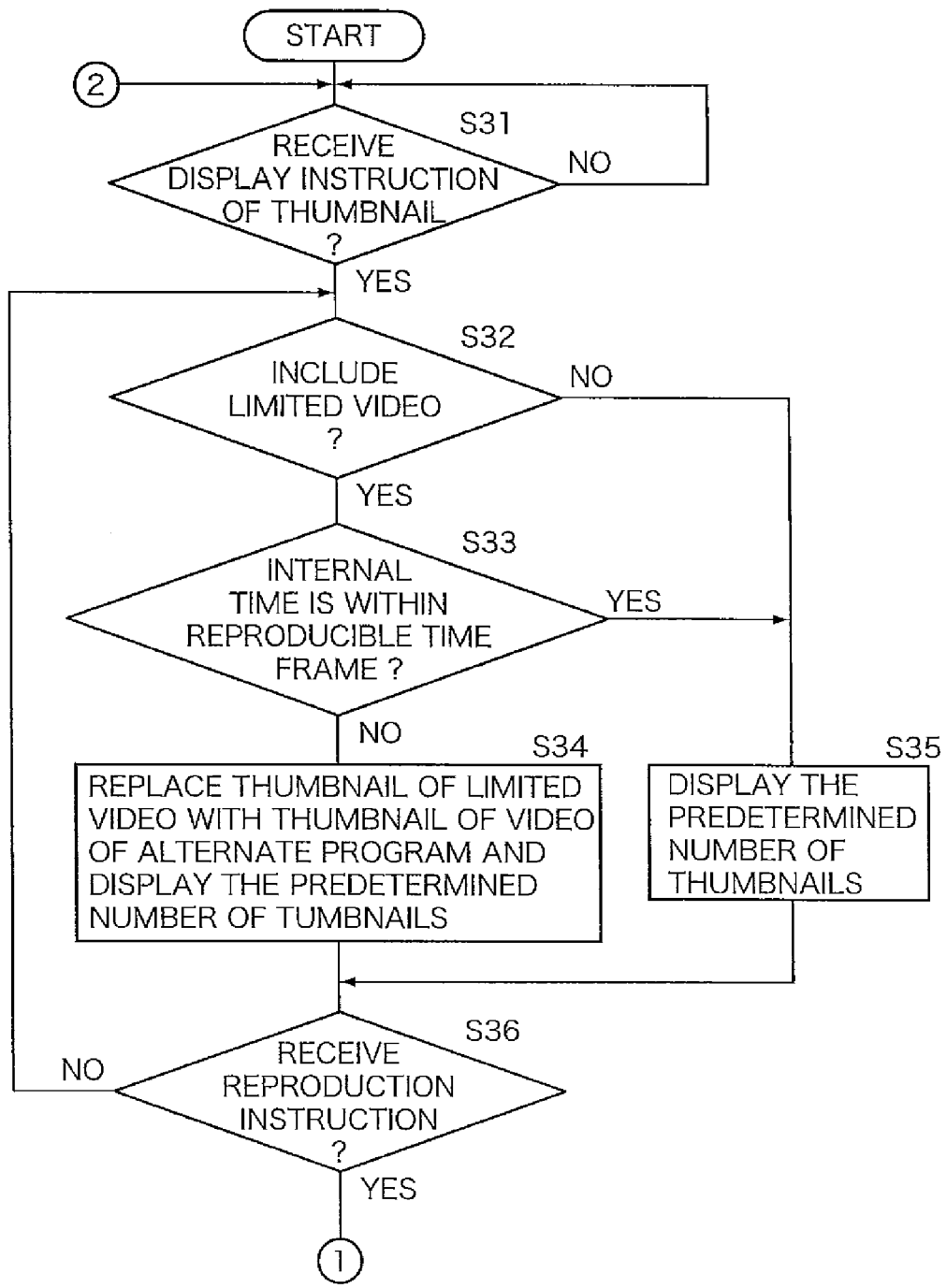
FIG. 4 A flowchart showing, together with FIG. 5, a processing procedure when the video reproducing apparatus according to Embodiment 1 reproduces the video.
Figure 5:
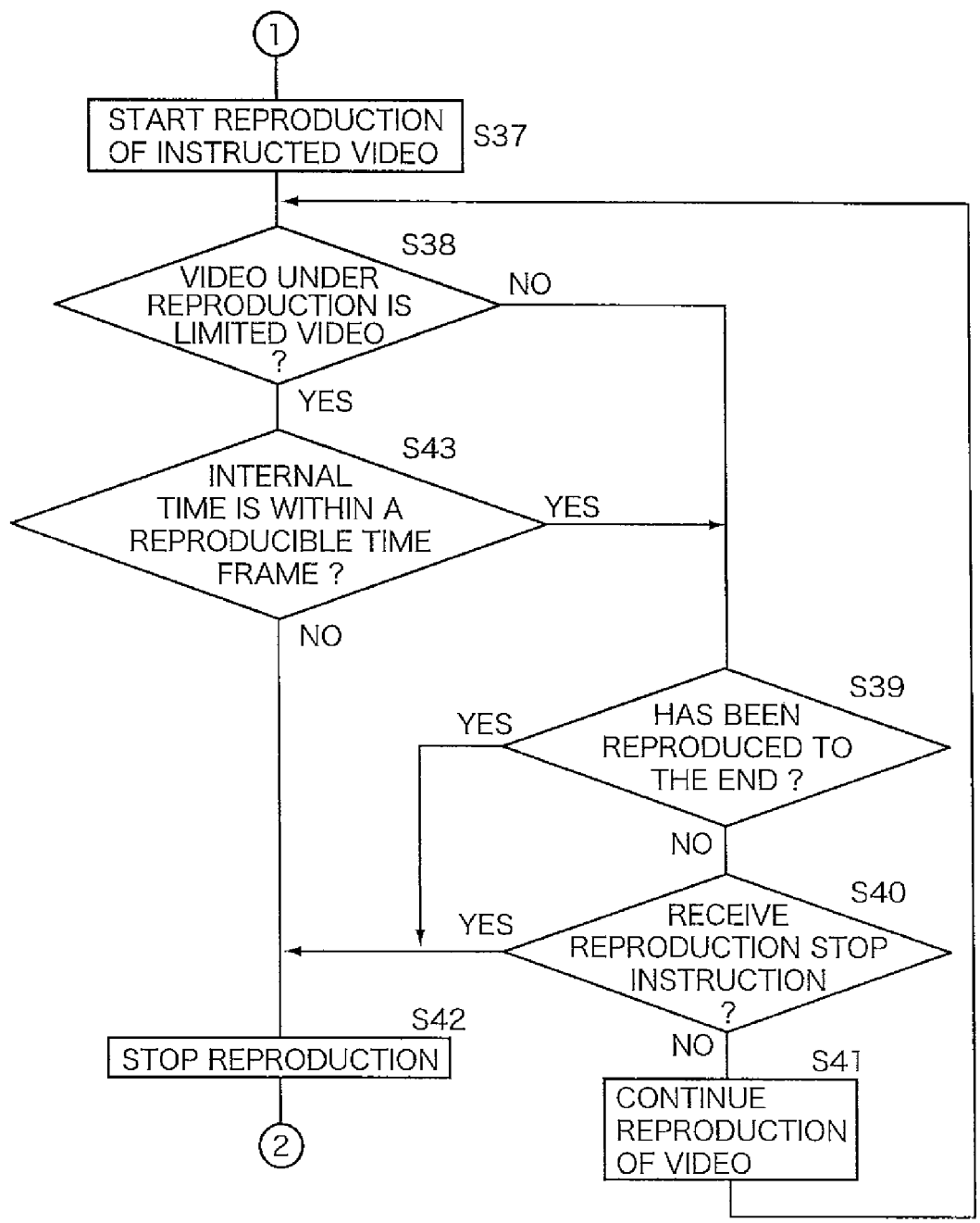
FIG. 5 A flowchart showing, together with FIG. 4, the processing procedure when the video reproducing apparatus according to Embodiment 1 reproduces the video.

FIG. 4 and FIG. 5 are flowcharts showing a processing procedure when the video reproducing apparatus 1 according to Embodiment 1 reproduces a video, and the control section 11 executes it according to the control program stored in the ROM 13.

As mentioned above, the drive section 22 may record two or more videos within the storage capacity of the recording medium. Therefore, as supporting means for selecting a video that the user wants to reproduce from the two or more videos recorded in the recording medium of the drive section 22, the control section 11 may process to display thumbnails, each of which is a reduced image of an image (for example, an image at the recording start clock time) contained in each of the videos recorded in the recording medium of the drive section 22, on the screen of the television receiver 3. However, because there is a limit to the number of thumbnails that can be displayed on the screen of the television receiver 3 at the same time, the control section 11 simultaneously displays a predetermined number of thumbnails corresponding to the predetermined number of videos on the screen of the television receiver 3, respectively, from those with newer recording start clock times, for example.

The control section 11 stands by for an acceptance of a display instruction of the thumbnails of the videos recorded in the recording medium of the drive section 22 (S31). In the meantime, the display instruction of the thumbnails of the videos is given to the video reproducing apparatus 1 by the user operating the operating section 16 or the remote controller. When there is no acceptance of the display instruction of the thumbnails (S31: NO), the control section 11 continues standing by for the acceptance of the display instruction of the thumbnails. When the display instruction of the thumbnails has been accepted by the operating section 16 or the remote controller optical receiving section 17 (S31: YES), the control section 11 determines whether a limited video associated with the limiting information is included in the predetermined number of videos that are recorded in the recording medium of the drive section 22 to be displayed as thumbnails (S32). When it is determined that a limited video is included in the predetermined number of videos to be displayed as thumbnails (S32: YES), the control section 11 determines whether the internal clock time is within time period from the recording start clock time of the limited video to be displayed as thumbnails to the predetermined clock time stored in the ROM 13, that is, time period during which the limited video can be reproduced (hereinafter, referred to as "reproducible time period") (S33). When it is determined that the internal clock time is not within the reproducible time period of the limited video (S33: NO), the control section 11 replaces the thumbnail of the limited video among the predetermined number of thumbnails with a thumbnail of the video of the counterprogram recorded simultaneously with the limited video, and displays the predetermined number of thumbnails on the screen of the television receiver 3 with the thumbnail of the video that is not a limited video (S34).

In Step S32, when it is determined that a limited video is not included in the predetermined number of videos to be displayed as thumbnails (S32: NO), or in Step S33, when it is determined that the internal clock time is within the reproducible time period of the limited video (S33: YES), the control section 11 displays the predetermined number of thumbnails corresponding to the predetermined number of videos on the screen of the television receiver 3, respectively, by outputting data for the predetermined number of thumbnails as they are from the output section 24 to the television receiver 3 (S35).

After a process of Step S34 or Step S35 is finished, the control section 11 stands by for an acceptance of a reproduction instruction of any one of the two or more videos whose thumbnails are displayed on the television receiver 3 (S36). In the meantime, the reproduction instruction of the video is given to the video reproducing apparatus 1 by the user operating the operating section 16 or the remote controller. When there is no acceptance of the reproduction instruction (S36: NO), the control section 11 returns the process to Step S32. Therefore, when the user does not perform any operation where the thumbnails are displayed, the control section 11 continues the display of the predetermined number of thumbnails by repeating the processes from Step S32 to Step S36, as mentioned above.

By the way, in this case, the determination result in Step S32 as mentioned above will not change, and when it is "NO" (a limited video is not included in the predetermined number of videos), the control section 11 continues displaying the same thumbnails as before on the television receiver 3. Further, when the determination result in Step S32 is "YES" (a limited video is included in the predetermined number of videos), the control section 11 executes the determination process in Step S33, as mentioned above. By the way, this determination result in Step S33 may change from "YES" to "NO" or vice versa, from "NO" to "YES" as time passes. Therefore, when the internal clock time shifts from outside the reproducible time period of the limited video (S33: NO) to inside the reproducible time period (S33: YES) while the user does not perform any operation where the thumbnails are displayed, the predetermined number of thumbnails including the thumbnail of the limited video are displayed as they are, in place of the thumbnail of the video of the counterprograms being displayed till then (S35). On the contrary, when the internal clock time shifts from inside the reproducible time period of the limited video (S33: YES) to outside the reproducible time period (S33: NO) while the user does not perform any operation where the thumbnails are displayed, the thumbnail of the limited video being displayed till then, is replaced with the thumbnail of the video of the counterprogram, and the predetermined number of thumbnails are displayed (S34).

In either case, when a reproduction instruction of any one of the videos has been accepted while the predetermined number of thumbnails are displayed as mentioned above (S36: YES), the control section 11 causes the drive section 22 to read-out from the recording medium data of the video instructed for the reproduction, and causes the signal processing section 21 to process the read-out data and to output it from the output section 24 to the television receiver 3. Thus, by the television receiver 3 displaying the video based on the data outputted from the signal processing section 21, reproduction of the video instructed for the reproduction is started (S37).

After the reproduction of the video has been started, until the reproduction of the video is finished, the control section 11 repeatedly executes the following process. First, the control section 11 determines whether the video under reproduction is a limited video (S38). When the video under reproduction is not a limited video (S38: NO), the control section 11 determines whether the video under reproduction has been reproduced to the end (S39), and determines whether a reproduction stop instruction by the user operating the operating section 16 or the remote controller has been accepted (S40). When the reproduction of the video under reproduction has not been performed to the end (S39: NO) and the reproduction stop instruction has not been accepted (S40: NO), the control section 11 returns the process to Step S38, and repeats a similar process as mentioned above while continuing the reproduction of the video (S41). When the reproduction of the video under reproduction has been performed to the end (S39: YES), or when a reproduction stop instruction has been accepted (S40: YES), the control section 11 stops the reproduction of the video (S42), and returns the process to Step S31. Therefore, when the reproduction of the video that is not a limited video has been started, the video will be reproduced to the end unless the user instructs a stop for the reproduction.

On the other hand, when the video under reproduction is a limited video (S38: YES), the control section 11 determines whether the internal clock time is within the reproducible time period of the limited video (S43). When it is determined that the internal clock time is within the reproducible time period of the limited video (S43: YES), the control section 11 proceeds the process to Step S39, and performs a similar process to the process in the case that the video under reproduction is not a limited video, as mentioned above.

However, when it is determined that the internal clock time is not within the reproducible time period of the limited video (S43: NO), specifically, when the internal clock time shifts from inside the reproducible time period (S43: YES) to outside the reproducible time period (S43: NO) during the reproduction of the limited video, the control section 11 forcibly stops the reproduction of the limited video that is under reproduction (S42), and returns the process to Step S31. Therefore, though the reproduction of the limited video can be started during the reproducible time period of the limited video, the reproduction of the limited video will be stopped when the reproducible time period of the limited video is over. In this case, because the reproducible time period of the limited video has already passed, though the user again instructs to display the thumbnails in order to again reproduce the limited video whose reproduction was stopped, the thumbnail of the counterprogram will be displayed without displaying the thumbnail of the limited video, as mentioned above. Therefore, the limited video whose reproduction has been forcibly stopped cannot be reproduced until the next reproducible time period of the limited video comes.

In the meantime, where the videos more than the number corresponding to the predetermined number of thumbnails being displayed on the screen of the television receiver 3 are recorded in the recording medium of the drive section 22, it may be possible to display the thumbnails of the respective videos from those with newer recording start clock times to those with older recording start clock times per a predetermined number at a time, by the user operating the operating section 16 or the remote controller. Of course, when a thumbnail displayed in this way is specified by the user operating the operating section 16 or the remote controller similar to that as mentioned above, reproduction of a corresponding video will be started and, thus, the procedure according to the flowchart shown in FIG. 4 and FIG. 5 will be processed.

Figure 6A:
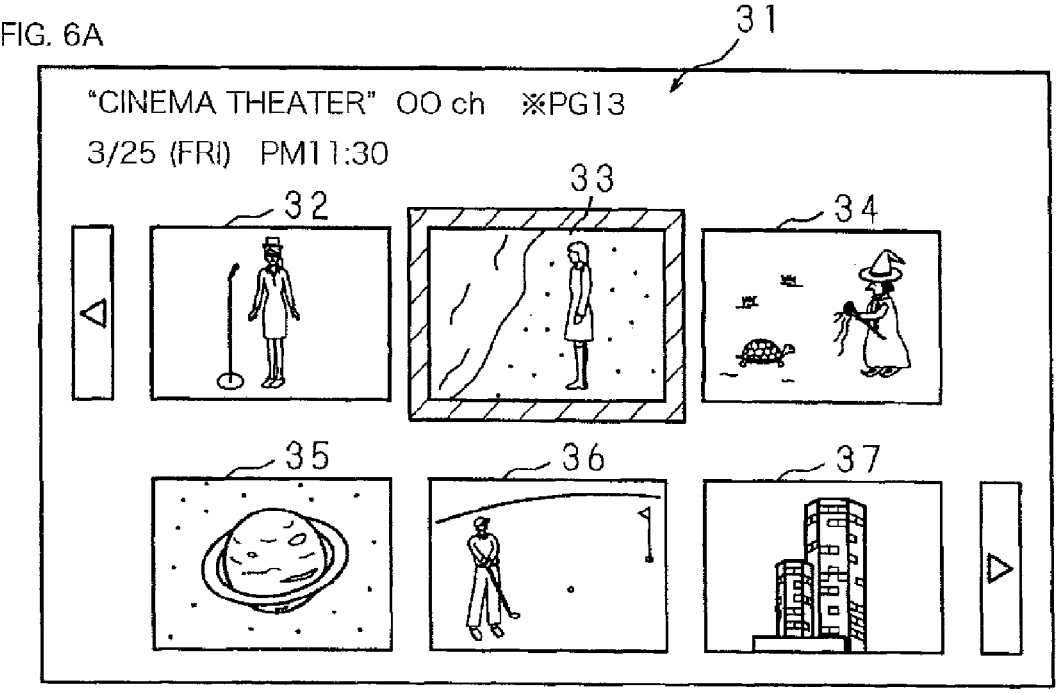
FIG. 6 A schematic views illustrating states in which a predetermined number of thumbnails are displayed on a screen of a television receiver.
Figure 6B:
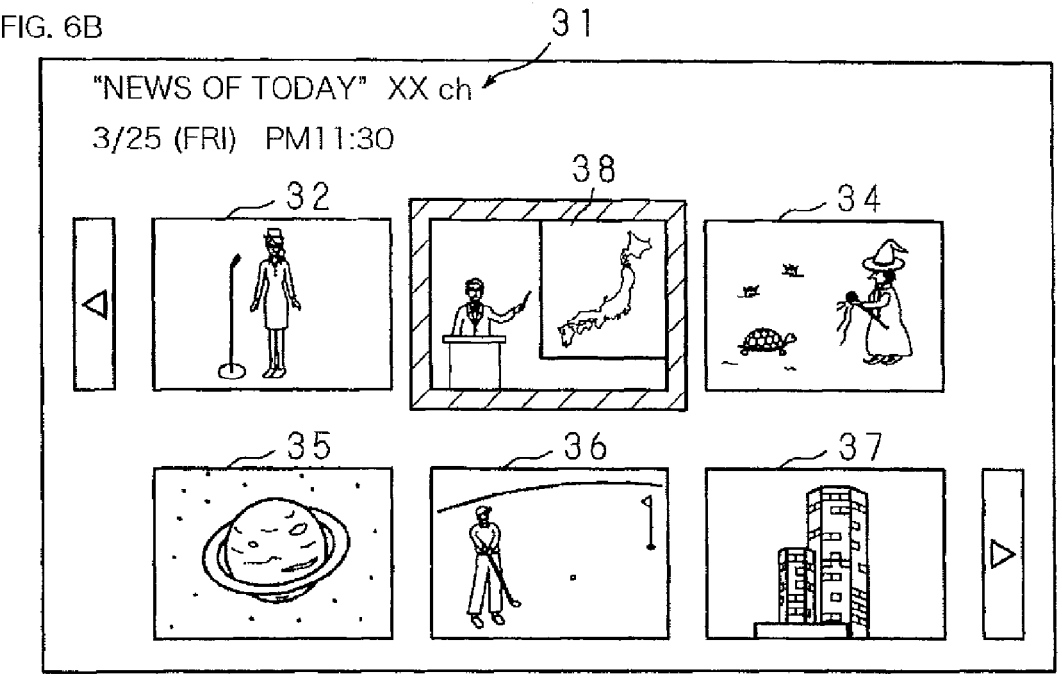

FIG. 6 is schematic views illustrating states in which a predetermined number of thumbnails are displayed on the screen of the television receiver 3. FIG. 6(a) shows a case where a thumbnail of the limited video is displayed during the reproducible time period, and FIG. 6(b) shows a case where a thumbnail of the limited video is displayed during a time period other than the reproducible time period.

A plurality of thumbnails 32, 33 (or 38), 34, 35, 36 and 37 are displayed on the screen of the television receiver 3. By operating the operating section 16 or the remote controller to select any one of the thumbnails, the user can start reproduction of the selected video. FIG. 6(a) shows a state where the thumbnail 33 is selected, and FIG. 6(b) shows a state where the thumbnail 38 is selected. Further, for the selected thumbnail, the metadata 31 such as a recording start clock time, recording date, program name and channel number are displayed on an upper left portion of the screen. During the reproducible time period of the limited video, as shown in FIG. 6(a), the thumbnail 33 of the limited video is displayed as it is, and an indication of "PG-13" indicating that the video of the thumbnail 33 is a limited video is also included in the metadata 31. On the other hand, during a time period other than the reproducible time period of the limited video, as shown in FIG. 6(b), the thumbnail 33 of the limited video is not displayed, and the thumbnail 38 of the video of the counterprogram to the limited video is displayed instead. However, because this image of the thumbnail 38 is not the limiting information, the metadata 31 thereof does not include data indicative of the limited video.

In the meantime, although examples in which one thumbnail of the limited video is included are shown in FIG. 6, two or more thumbnails of limited videos may exist among the predetermined number of thumbnails displayed on the same screen and at the same time. However, when the recording start clock time of the respective limited videos differs from the others, the number of thumbnails of the limited videos to be displayed may differ depending on the internal clock time.

As mentioned above, in the video reproducing apparatus 1 according to Embodiment 1 of the invention, because it is configured so that the user specifies a video that he/she wants to reproduce by selecting its thumbnail, the thumbnail 33 of the limited video is not displayed during a time period other than the reproducible time period of the limited video. For this reason, reproduction of the limited video cannot be started during a time period other than the reproducible time period of the limited video. Further, though the reproduction of the limited video was started during the reproducible time period of the limited video, the reproduction of the limited video will be forcibly stopped when it passes the reproducible time period of the limited video during the reproduction, and the limited video cannot be reproduced until the next reproducible time period of the limited video comes. Therefore, the limited video recorded in the recording medium of the drive section 22 is inhibited from being reproduced during a time period other than the reproducible time period.

In the meantime, in Embodiment 1 mentioned above, a process to display the thumbnails on the screen of the television receiver 3 as content information of the videos has been performed. However, the video reproducing apparatus 1 may also be configured so that the metadata of the respective videos are displayed in a list on the screen of the television receiver 3 as the content information of the videos, and the user selects a video that he/she wants to reproduce using the metadata. Also in this case, the video reproducing apparatus 1 displays the metadata of the counterprogram corresponding to each of the limited videos instead of the metadata of the limited video during a time period other than the reproducible time period of each of the limited videos.

As explained in detail above, the video reproducing apparatus 1 according to Embodiment 1 of the invention also records the video of the counterprogram when recording the limited video to be limited in viewing by a viewer such as a young person not satisfying the view allowance condition. When the thumbnail indicating the recorded limited video is displayed on the screen of the television receiver 3, the thumbnail of the video of the counterprogram is displayed during a time period other than the reproducible time period of the limited video, and the thumbnail of the limited video is displayed during the reproducible time period. As a result, because the thumbnail of the limited video is not displayed on the screen of the television receiver 3 during a time period other than the reproducible time period of the limited video, the viewer cannot recognize that the limited video is recorded and, thus, it is possible to surely prevent the limited video from being reproduced. Therefore, when the broadcasting time period of the limited videos is limited to the middle of the night during which young people are asleep, though the limited video is recorded, because the recorded limited video is reproducible only during a time period from a recording start clock time of the limited video itself, that is, from a broadcasted clock time at which the limited video is actually broadcasted, to the predetermined clock time (the reproducible time period of the limited video), it is possible to prevent the viewer not satisfying the view allowance condition from viewing the limited video.

Further, the video reproducing apparatus 1 according to Embodiment 1 of the invention displays the thumbnail of the video of the counterprogram to the limited video on the screen of the television receiver 3 during a time period other than the reproducible time period of the limited video. Thus, by the user who performed a reservation for timer recording of the limited video checking the thumbnail of the counterprogram, he/she can check that the limited video is recorded though the thumbnail of the limited video is not displayed. Further, because the video of the counterprogram is encoded with a compression ratio higher than a limited video, and is recorded in the recording medium of the drive section 22, it is possible to reduce an extra volume of the recording medium necessary to record the counterprogram as much as possible.

Further, in the present invention, because the internal clock time (i.e., the clock time inside the video reproducing apparatus 1 that is clocked by the clocking section 14) is synchronized with the external clock time of the video reproducing apparatus 1 (the standard time of the area where the video reproducing apparatus 1 is installed) using the external clock time information indicative of the external clock time, it is possible to correctly manage the reproducible time period of the limited video. For this reason, it is possible to prevent an irregular operation to reproduce the limited video during a time period other than the reproducible time period of the limited video by intentionally changing the internal clock time clocked by the clocking section 14 in the video reproducing apparatus 1. Therefore, it is possible to surely prevent a viewer not satisfy the view allowance condition from viewing the limited video during a time period other than the reproducible time period of the limited video by irregularly operating the internal clock time.

In the meantime, in Embodiment 1, upon a reservation for timer recording, although it is configured so that it acquires the limiting information specifying that a program is a program of the limited video based on the EPG data, or acquires the limiting information from the operation of the user, the method of acquiring the limiting information is not limited thereto. Some broadcasting stations may broadcast a limited video with a broadcasting signal including information specifying that it is a limited video. Therefore, when the video reproducing apparatus 1 according to the invention receives and records the broadcasting signal including the information specifying that it is such a limited video, the video reproducing apparatus 1 may also be configured so that it records the received video and the limiting information associated with each other.

In the meantime, in Embodiment 1, it is configured so that it performs a process to record the video of the counterprogram together with the limited video, and display the thumbnail of the video of the counterprogram instead of the limited video during a time period other than the reproducible time period, that is, time period other than time period from the recording start clock time of the limited video to the predetermined clock time. However, the video reproducing apparatus 1 according to Embodiment 1 may also be configured so that it does not record the video of the counterprogram. In this case, it may be preferable that only a predetermined number of thumbnails of videos other than the limited video are displayed during a time period other than the reproducible time period of the limited video.

Further, the video reproducing apparatus 1 according to the invention may also be configured so that it allows the television receiver 3 to display the thumbnail of the limited video also during a time period other than the reproducible time period, and the user can arbitrarily set whether to display the thumbnail of the limited video during a time period other than the reproducible time period. In this case, though the display of the thumbnail of the limited video is instructed during a time period other than the reproducible time period, it may be preferable to configure the video reproducing apparatus 1 so as not to perform the display.

Further, in Embodiment 1, although the video reproducing apparatus 1 is configured so that the video reproducing apparatus 1 itself limits reproduction of the video recorded in the recording medium with the drive section 22, it may not be limited thereto. For example, of course, when a recording medium in which data of a video is recorded by other recording apparatus is loaded to the drive section 22, it may also be possible to perform a process to limit reproduction of the limited video recorded in the recording medium. Further, the video reproducing apparatus 1 may be a play-only apparatus. Also, in this case, it may be possible to realize a function of the video reproducing apparatus of the present invention by limiting reproduction of a limited video when the video recorded in the recording medium by the other recording apparatus is reproduced.

Embodiment 2

Next, a video reproducing apparatus according to Embodiment 2 of the invention will be explained. In Embodiment 2, the video reproducing apparatus 1 performs a process to unexceptionally limit reproduction of a video recorded during specific time period such as the middle of the night during which there is a possibility that a limited video is broadcasted (hereinafter, referred to as limiting time period). The video reproducing apparatus of such an Embodiment 2 is effective, for example, when timer recording a program that does not include information specifying a program of the limited video, when timer recording an analog TV broadcasting by a manual setting, or when starting a recording of an analog TV broadcasting directly by an operation of the user with the operating section 16 or the remote controller.

However, because an internal configuration example of the video reproducing apparatus 1 according to Embodiment 2 is similar to that of the video reproducing apparatus according to Embodiment 1 shown in FIG. 1, an explanation thereof will be omitted. In Embodiment 2, by the user operating the operating section 16 or the remote controller, specific time period during which there is a possibility that a limited video is broadcasted (for example, from 11:00 p.m. to 5:00 a.m.) is specified. The video reproducing apparatus 1 sets the specified time period as limiting time period, and stores the set limiting time period in the RAM 12. Further, similar to the case of Embodiment 1, the video reproducing apparatus 1 performs a process to accept a reservation for programmed recording, and record a video of the reserved program and metadata thereof associated with each other in a recording medium by the drive section 22.

Figure 7:
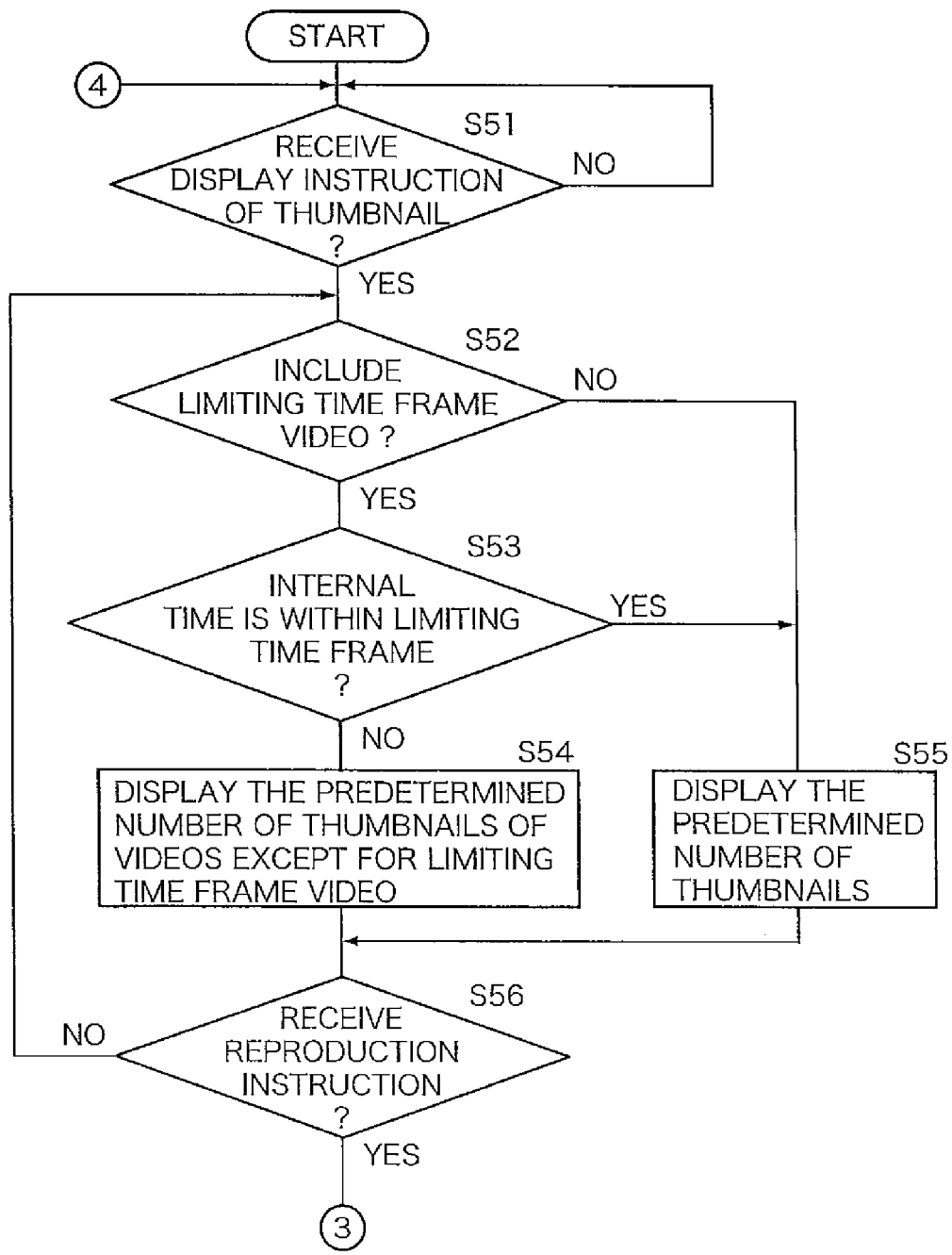
FIG. 7 A flowchart showing, together with FIG. 8, a processing procedure when a video reproducing apparatus according to Embodiment 2 reproduces a video, together with FIG. 8.
Figure 8:
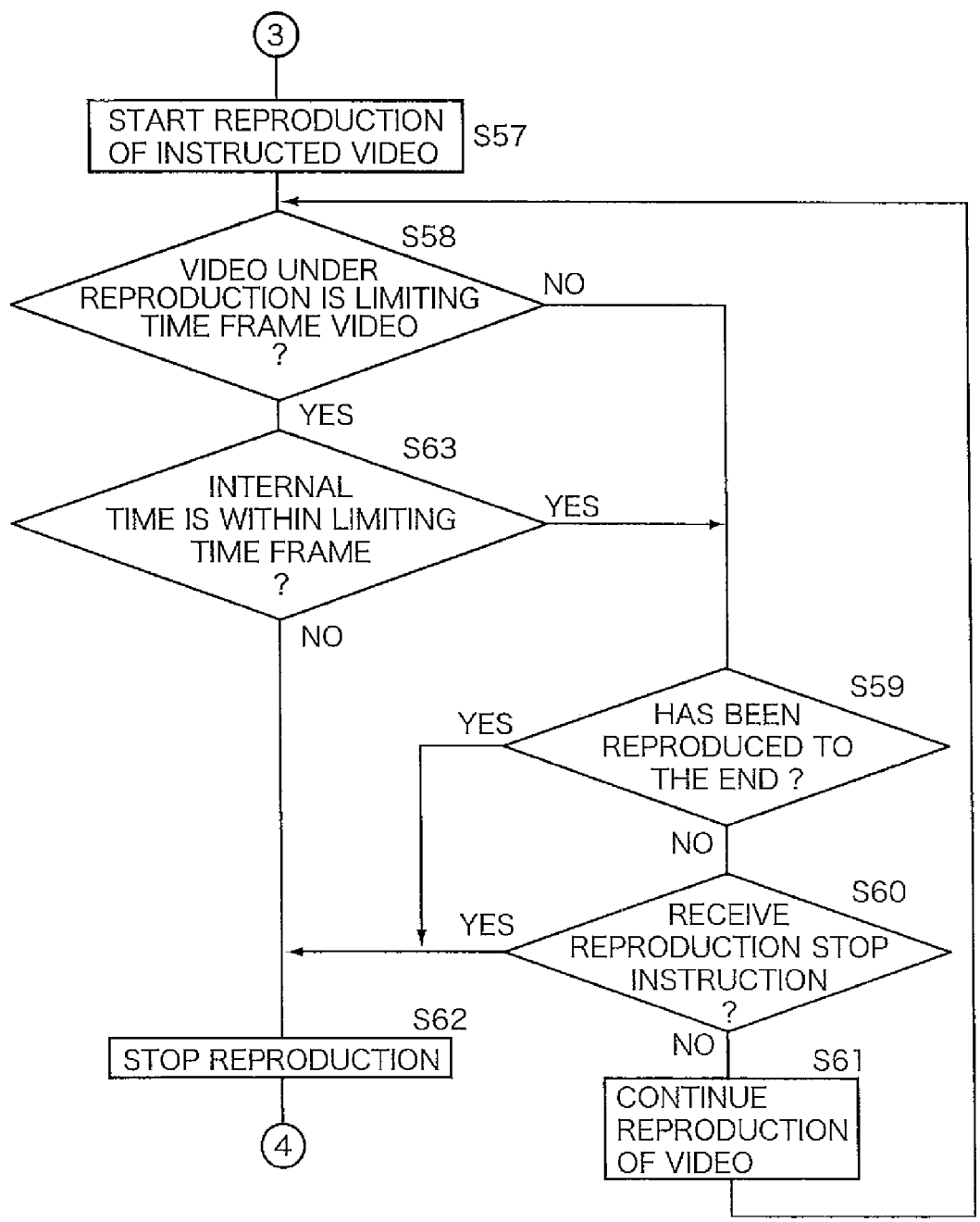
FIG. 8 A flowchart showing, together with FIG. 7, the processing procedure when the video reproducing apparatus according to Embodiment 2 reproduces the video.

FIG. 7 and FIG. 8 are flowcharts showing a processing procedure when the video reproducing apparatus 1 according to Embodiment 2 reproduces a video, and the control section 11 executes it according to the control program stored in the ROM 13.

The control section 11 stands by for an acceptance of a display instruction of thumbnails of the videos recorded in the recording medium of the drive section 22 (S51). In the meantime, the display instruction of the thumbnails of the videos is given to the video reproducing apparatus 1 by the user operating the operating section 16 or the remote controller. When there is no acceptance of the display instruction of the thumbnails (S51: NO), the control section 11 continues standing by for the acceptance of the display instruction of the thumbnails. When the display instruction of the thumbnails has been accepted by the operating section 16 or the remote controller optical receiving section 17 (S51: YES), the control section 11 determines whether a video, whose recording start clock time is included within the limiting time period stored in the RAM 12 (hereinafter, referred to as limiting time period video), is included in the predetermined number of videos to be displayed with thumbnails by referring to metadata associated with the video and recorded in the recording medium of the drive section 22 (S52). When it is determined that the limiting time period video is included (S52: YES), the control section 11 determines whether the internal clock time is within the limiting time period (S53). When it is determined that the internal clock time is not within the limiting time period (S53: NO), the control section 11 displays a predetermined number of thumbnails of the videos on the screen of the television receiver 3 except for the limiting time period video (S54).

In Step S52, when it is determined that there is no limiting time period video in the two or more videos to be displayed by the thumbnails (S52: NO), or in Step S53, when it is determined that the internal clock time is within the limiting time period (S53: YES), the control section 11 displays the predetermined number of thumbnails corresponding to the predetermined number of videos on the screen of the television receiver 3, respectively, by outputting data of the predetermined number of thumbnails as they are, from the output section 24 to the television receiver 3 (S55).

After the process in Step S54 or Step S55 is finished, the control section 11 stands by for an acceptance of a reproduction instruction of any one of the two or more videos whose thumbnails are displayed on the television receiver 3 (S56). In the meantime, the reproduction instruction of the video is given to the video reproducing apparatus 1 by the user operating the operating section 16 or the remote controller. When there has been no acceptance of the reproduction instruction (S56: NO), the control section 11 returns the process to Step S52. Therefore, when the user does not perform any operation where the thumbnails are displayed, the control section 11 continues the display of the predetermined number of thumbnails by repeating the process from Step S52 to Step S56, as mentioned above.

By the way, in this case, the determination result in Step S52 mentioned above will not change, and when it is "NO" (where limiting time period video is not included in the predetermined number of thumbnails), the control section 11 continues displaying the same thumbnails as before on the screen of the television receiver 3. Further, when the determination result in Step S52 is "YES" (where limiting time period video is included in the predetermined number of thumbnails), the control section 11 performs the determination process in Step S53, as mentioned above. By the way, the determination result in Step S53 may change from "YES" to "NO", or vise versa from "NO" to "YES", as time passes. Therefore, when the internal clock time shifts from outside the limiting time period (S53: NO) to inside the limiting time period (S53: YES) while the user does not perform any operation where the thumbnails are displayed, the predetermined number of thumbnails, including the thumbnail of the limiting time period video that has not been displayed till then are displayed (S55). On the contrary, when the internal clock time shifts from inside the limiting time period (S53: YES) to outside the limiting time period (S53: NO) while the user does not perform any operation where the thumbnails are displayed, the predetermined number of thumbnails not including the thumbnail of the limiting time period video that has been displayed till then are displayed (S54).

In either case, when the reproduction instruction of any one of the videos has been accepted while the predetermined number of thumbnails are displayed as mentioned above (S56: YES), the control section 11 causes the drive section 22 to read out data of the video that is instructed for the reproduction from a recording medium, and causes the signal processing section 21 to process the read-out data and output it from the output section 24 to the television receiver 3. Thus, the reproduction of the video that is instructed for reproduction is started by reproducing the video on the screen of the television receiver 3 based on the data outputted from the signal processing section 21 (S57).

The control section 11 repeatedly executes the following process until the reproduction of the video is finished after the reproduction of the video has been started. First, the control section 11 determines whether the video under reproduction is the limiting time period video (S58). When the video under reproduction is not the limiting time period video (S58: NO), the control section 11 determines whether the video under reproduction has been reproduced to the end (S59), and whether it has accepted a reproduction stop instruction by the user operating the operating section 16 or the remote controller (S60). When the reproduction of the video under reproduction has not been performed to the end (S59: NO) and the reproduction stop instruction has not been accepted (S60: NO), the control section 11 returns the process to Step S58 and repeats a similar process as mentioned above while continuing the reproduction of the video (S61). When the reproduction of the video under reproduction has been performed to the end (S59: YES), or when the reproduction stop instruction has been accepted (S60: YES), the control section 11 stops the reproduction of the video (S62), and returns the process to Step S51. Therefore, when the reproduction of the video whose recording start clock time is not included in the limiting time period, that is, the video that is not a limiting time period video, has been started, the video will be reproduced to the end unless the user instructs a stop for the reproduction.

When the video under reproduction is a limiting time period video (S58: YES), the control section 11 determines whether the internal clock time is within the limiting time period (S63). When it is determined that the internal clock time is within the limiting time period (S63: YES), the control section 11 proceeds the process to Step S59, and performs a similar process to the case where the video under reproduction is not the limiting time period video, as mentioned above.

However, when it is determined that the internal clock time is not within the limiting time period (S63: NO), specifically, when the internal clock time shifts from inside the limiting time period (S63: YES) to outside the limiting time period (S63: NO) during the reproduction of the limiting time period video, the control section 11 forcibly stops the reproduction of the limiting time period video under reproduction (S62), and returns the process to Step S51. Therefore, though the reproduction of the limiting time period video could have been started during the limiting time period, the reproduction of the video will be stopped when the limiting time period is over. In this case, because it has already passed the limiting time period, though the user again instructs the display of the thumbnails to reproduce the video again that was stopped in its reproduction, the thumbnail of the limiting time period video will not be displayed. Therefore, the video whose reproduction was forcibly stopped cannot be reproduced until the next limiting time period comes.

In the meantime, when videos more than the number corresponding to the predetermined number of thumbnails being displayed on the screen of the television receiver 3 are recorded in the recording medium of the drive section 22, by the user operating the operating section 16 or the remote controller, it is possible to display the thumbnails of the respective videos per a predetermined number at a time, from those with older recording start clock times to those with newer recording start clock times. Of course, similar to the above, when a thumbnail displayed in this way is specified by the user operating the operating section 16 or the remote controller, then reproduction of the corresponding video is started, and it will be processed in the procedure according to the flowchart shown in FIG. 7 and FIG. 8.

As mentioned above, in Embodiment 2, the middle of the night when the limited video may be broadcasted is set as the limiting time period. Further, when the thumbnails of the recorded videos are displayed for reproduction of the videos, for a thumbnail of a video (a limiting time period video) that was started its recording at a clock time included in the set limiting time period, it is displayed during the limiting time period and not displayed during a time period other than the limiting time period. As a result, because the thumbnail of the video (a limiting time period video) that is started its recording at a clock time included in the limiting time period and may include a limited video that is not displayed on the screen of the television receiver 3 during a time period other than the limiting time period, a viewer cannot recognize that such a video is recorded and, thus, it is possible to surely prevent the limited video from being reproduced. Further, though reproduction of the limiting time period video is started during the limiting time period, the reproduction of the limiting time period video will be forcibly stopped when it passes the limiting time period during the reproduction and, then, it cannot be reproduced until the next limiting time period comes. Therefore, though the limited video broadcasted during the limiting time period was recorded, since the recorded limited video is reproducible only during the limiting time period, it is possible to prevent a viewer not satisfying the view allowance condition from viewing the limited video.

In the meantime, in Embodiment 2, although the video reproducing apparatus 1 is configured so that the video reproducing apparatus 1 itself limits the reproduction of the video recorded in the recording medium by the drive section 22, it may not be limited thereto. For example, when a recording medium in which data of a video was recorded by other recording apparatus is loaded into the drive section 22, of course, it may also be configured so that a process to inhibit reproduction of a video (a limiting time period video), whose recording start clock time is included in the limiting time period set in the video reproducing apparatus 1 according to the invention, among the videos recorded in the recording medium is performed during a time period other than the limiting time period. Further, the video reproducing apparatus 1 may be a play-only apparatus. Even in this case, when reproducing the video recorded in the recording medium by the other recording apparatus, it may be possible to realize a function of the video reproducing apparatus of the invention by inhibiting reproduction of the video, whose recording start clock time is included in the limiting time period set in the video reproducing apparatus 1, during a time period other than the limiting time period.

Embodiment 3

Next, a video reproducing apparatus according to Embodiment 3 of the invention will be explained. The video reproducing apparatus 1 according to Embodiment 1 mentioned above is configured so that it limits viewing of a limited video by a viewer not satisfying the view allowance condition by inhibiting reproduction of the limited video during a time period other than the time period from a recording start clock time of the recorded limited video to the predetermined clock time (the reproducible time period of the limited video). However, the video reproducing apparatus 1 according to Embodiment 3 of the invention reproduces the limited video with a degraded image quality during a time period other than the reproducible time period.

However, because an internal configuration example of the video reproducing apparatus 1 according to Embodiment 3 is similar to that of the video reproducing apparatus according to Embodiment 1 shown in FIG. 1, an explanation thereof will be omitted. Further, similar to the case of Embodiment 1, the video reproducing apparatus 1 according to Embodiment 3 performs a process to accept a reservation for timer recording, and associates a video of a program reserved for the timer recording with metadata and records the video and the metadata in a recording medium with the drive section 22. Further, the video reproducing apparatus 1 according to Embodiment 3 is also similar to that of Embodiment 1 in that a thumbnail that is a reduced image of an image contained in each video is displayed on the screen of the television receiver 3, as supporting means for the user to select a video to be reproduced among two or more recorded videos. However, in Embodiment 3, a thumbnail of a limited video is also displayed regardless of time period.

Figure 9:
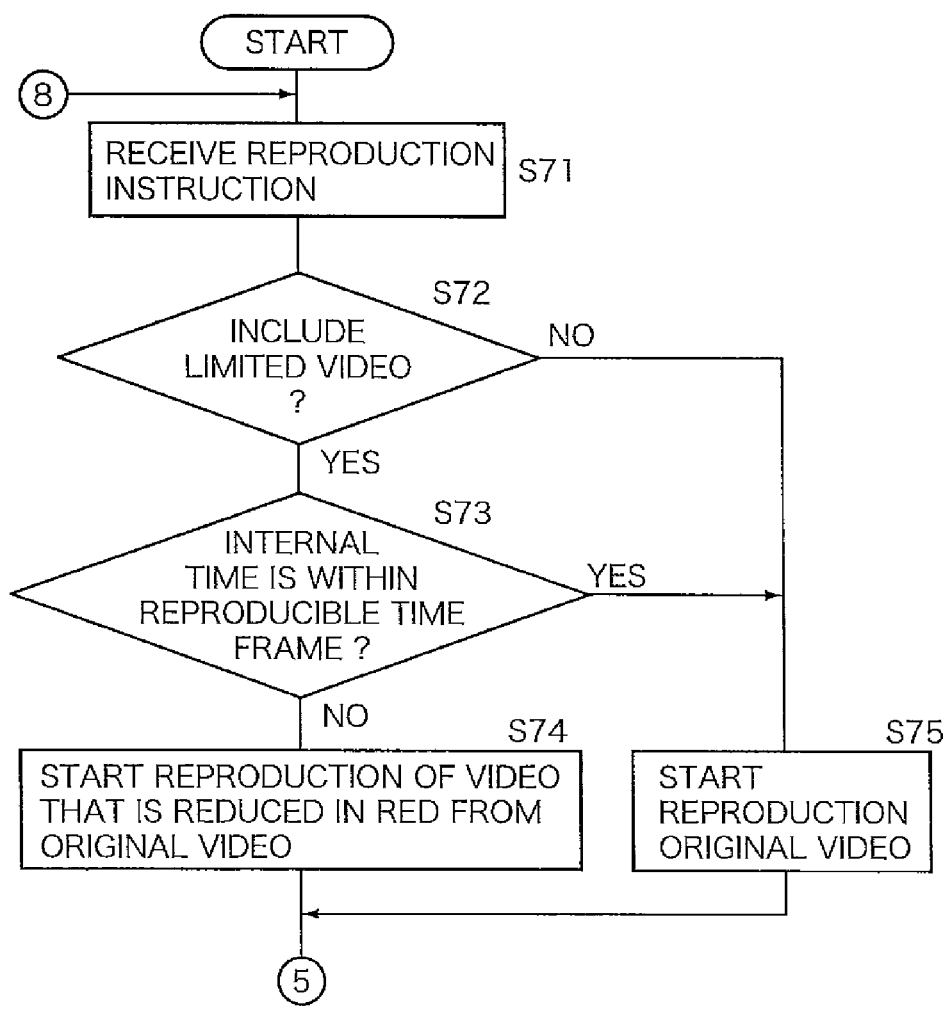
FIG. 9 A flowchart showing, together with FIG. 10 and FIG. 11, a processing procedure when the video reproducing apparatus according to Embodiment 3 reproduces a video.
Figure 10:
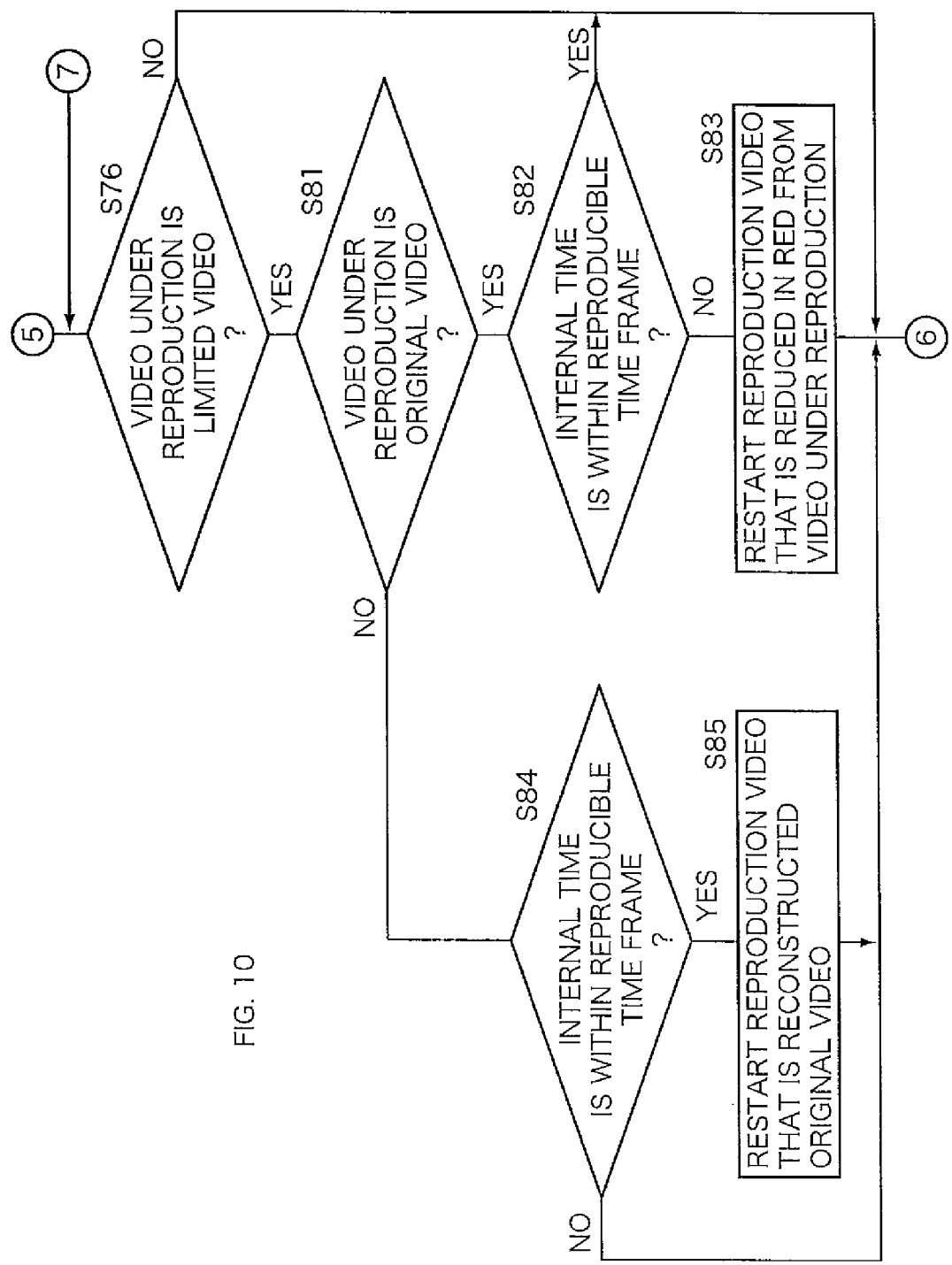
FIG. 10 A flowchart showing, together with FIG. 9 and FIG. 11, the processing procedure when the video reproducing apparatus according to Embodiment 3 reproduces the video.
Figure 11:
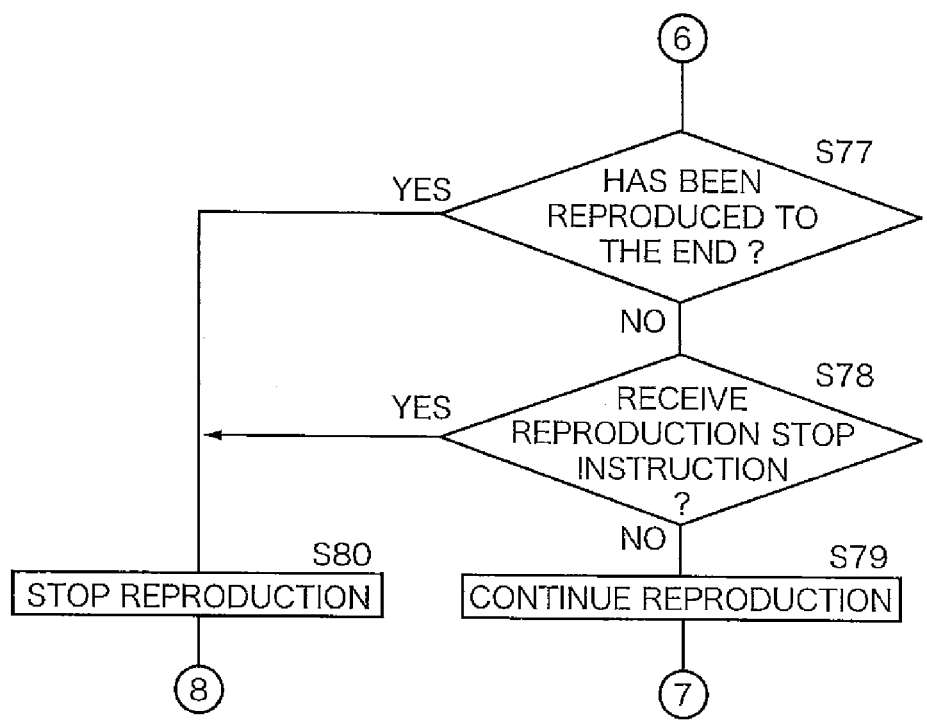
FIG. 11 A flowchart showing, together with FIG. 9 and FIG. 10, the processing procedure when the video reproducing apparatus according to Embodiment 3 reproduces the video.

FIG. 9, FIG. 10 and FIG. 11 are flowcharts showing a processing procedure when the video reproducing apparatus 1 according to Embodiment 3 reproduces a video, and the control section 11 executes it according to the control program stored in the ROM 13.

The control section 11 of the video reproducing apparatus 1 accepts a reproduction instruction specifying a video to be reproduced among two or more videos whose thumbnails are displayed on the screen of the television receiver 3 (S71). In this case, as mentioned above, a thumbnail of limited video is also displayed regardless of time period. Further, the reproduction instruction is given to the video reproducing apparatus 1 by the user operating the operating section 16 or the remote controller. The control section 11 then determines whether the video to be reproduced is a limited video is recorded associated with limiting information in the recording medium of the drive section 22 (S72). When it is determined that the video to be reproduced is a limited video (S72: YES), the control section 11 determines whether the internal clock time is within time period from a recording start clock time of the limited video to be reproduced to a predetermined clock time stored in the ROM 13, that is, a reproducible time period of the limited video (S73). When it is determined that the internal clock time is not within the reproducible time period of the limited video to be reproduced (S73: NO), the control section 11 causes the drive section 22 to read out data of the video instructed for reproduction from the recording medium, and causes the signal processing section 21 to perform a signal processing to reduce a red component from the read-out data and output it from the output section 24 to the television receiver 3. Thereby, the video reproducing apparatus 1 causes the television receiver 3 to start reproduction of the video that is reduced in red from the original video (S74).

On the other hand, in Step S72, when it is determined that the video to be reproduced is not a limited video (S72: NO), or in Step S73, when it is determined that the internal clock time is within the reproducible time period of the limited video to be reproduced (S73: YES), the control section 11 starts reproduction of the video instructed for the reproduction by reproducing the video (the original video, red of which is not reduced) on the screen of the television receiver 3 as it is (S75).

The control section 11 repeatedly executes the following process until the reproduction of the video is finished after the reproduction of the video has been started in Step S74 or S75. First, the control section 11 determines whether the video under reproduction is a limited video (S76). When the video under reproduction is not a limited video (S76: NO), the control section 11 determines whether the video under reproduction has been reproduced to the end (S77), and whether a reproduction stop instruction by the user operating the operating section 16 and the remote controller has been accepted (S78). When the reproduction of the video under reproduction has not been performed to the end (S77. NO), and when the reproduction stop instruction has not been accepted (S78: NO), the control section 11 returns the process to Step S76 and repeats a similar process as mentioned above, while continuing the reproduction of the video (in this case, the original video, red of which is not reduced) under reproduction (S79). When the reproduction of the video (in this case, the original video) under reproduction has been reproduced to the end (S77: YES), or when the reproduction stop instruction has been accepted (S78: YES), the control section 11 stops the reproduction of the video (S80), and returns the process to Step S71. Therefore, when reproduction of a video that is not a limited video has been started, the video will be reproduced to the end unless the user instructs a stop to the reproduction.

When the video under reproduction is a limited video (S76: YES), the control section 11 determines whether the video under reproduction is an original video (S81). When the video under reproduction is an original video (S81: YES), the control section 11 then determines whether the internal clock time is within the reproducible time period of the limited video (S82). When it is determined that the internal clock time is within the reproducible time period of the limited video (S82: YES), the control section 11 proceeds the process to Step S77, and performs a similar process to the case as mentioned above where the video under reproduction is not the limited video.

However, when it is determined that the internal clock time is not within the reproducible time period of the limited video (S82: NO), specifically, when the internal clock time shifts from inside the reproducible time period (S82: YES) to outside the reproducible time period during the reproduction of the limited video (S82: NO), the control section 11 restarts the reproduction of the limited video while reducing in red from this point, although the limited video has been reproduced by an original video (S83).

Thus, until the reproduction of the limited video is finished after the reproduction of the limited video reduced in red has been started, the control section 11 repeatedly executes the following process. First, the control section 11 determines whether the limited video under reproduction has been reproduced to the end (S77), and whether a reproduction stop instruction by the user operating the operating section 16 or the remote controller has been accepted (S78). When the limited video under reproduction reduced in red has not been reproduced to the end (S77: NO), and when a reproduction stop instruction has not been accepted (S78: NO), the control section 11 returns the process to Step S76, and repeats a similar process as mentioned above, while continuing the reproduction of the limited video reduced in red (S79). When the reproduction of the video under reproduction reduced in red has been performed to the end (S77: YES), or when the reproduction stop instruction has been accepted (S78: YES), the control section 11 stops the reproduction of the limited video reduced in red (S80), and returns the process to Step S71. Therefore, also when the reproducible time period of the limited video has passed after the reproduction of the limited video has been started during the reproducible time period, the limited video will be reproduced to the end in a state where red is reduced unless the user instructs a stop to the reproduction.

On the other hand, when the video under reproduction is a limited video but not an original video, that is, when the limited video has been reproduced in a state where red is reduced (S76: YES, and S81: NO), the control section 11 then determines whether the internal clock time is within the reproducible time period of the limited video (S84). When it is determined that the internal clock time is not within the reproducible time period of the limited video (S84: NO), the control section 11 proceeds the process to Step S77, and performs a similar process as mentioned above.

However, when it is determined that the internal clock time is within the reproducible time period of the limited video (S84: YES), specifically, when the internal clock time during the reproduction of the limited video reduced in red shifts from outside the reproducible time period (S84: NO) to inside the reproducible time period (S84: YES), the control section 11 restores the limited video that has been reproduced while being reduced in red till then to the original video, and restarts the reproduction (S85). After this, the control section 11 proceeds the process to Step S77, and performs a similar process as mentioned above.

Therefore, when it shifts into the reproducible time period of the limited video after the reproduction of the limited video has been started in a state where red is reduced during a time period other than the reproducible time period, the limited video will be reproduced to the end as an original video unless the user instructs a stop to the reproduction.

As mentioned above, in the video reproducing apparatus 1 according to Embodiment 3 of the invention, by reducing red from the video being reproduced on the screen of the television receiver 3, for example, because the color of blood does not appear in its original color in violence expression, and the color of skin appears bluish in sexual expression, the influence of the limited video on the viewer is reduced. Therefore, in Embodiment 3, by degrading the image quality of the limited video being reproduced during a time period other than the reproducible time period, also in the case that the limited video is reproduced by mistake during a time period other than the reproducible time period, it is possible to reduce the influence on a viewer not satisfying the view allowance condition, such as a young person who needs to be limited in viewing the limited video.

In the meantime, in Embodiment 3, although the video reproducing apparatus is configured so that red contained in the limited video is reduced as an example when reproducing the limited video during a time period other than the reproducible time period, the method of degrading the image quality of the limited video may not be limited thereto. As other methods, when the video reproducing apparatus 1 according to the invention reproduces the limited video during a time period other than the reproducible time period, a process of degrading the limited video using the other method such as converting the limited video into monochrome, or applying mosaic to the limited video, for example, may be performed.

Embodiment 4

Next, a video reproducing apparatus according to Embodiment 4 of the invention will be explained. The video reproducing apparatus according to Embodiment 2 mentioned above is configured so that it limits viewing of the limited video by a viewer not satisfying the view allowance condition by inhibiting reproduction of a video that is recorded during a specific limiting time period, during a time period other than the limiting time period. However, the video reproducing apparatus 1 according to Embodiment 4 of the invention, during a time period other than the limiting time period, reproduces a video, which is recorded during a specific limiting time period, by being degraded an image quality. The video reproducing apparatus of such Embodiment 4 is effective, for example, when a program not including information specifying a program of the limited video is timer-recorded, when an analog TV broadcasting is timer-recorded by a manual setting, or when a recording of an analog TV broadcasting is started directly by the user operating the operating section 16 or the remote controller.

However, because an internal configuration example of the video reproducing apparatus 1 according to Embodiment 4 is similar to that of the video reproducing apparatus according to Embodiment 1 shown in FIG. 1, an explanation thereof will be omitted. Further, similar to the case of Embodiment 2, the video reproducing apparatus 1 according to Embodiment 4 causes the RAM 12 to store a limiting time period set beforehand, accepts a reservation for timer recording, and records a video of the program reserved for timer-recording and metadata thereof associated with each other on a recording medium by the drive section 22. Further, it is similar to Embodiment 2 in that, as supporting means to cause a user to select a video to be reproduced from two or more recorded videos, the video reproducing apparatus 1 performs a process to display a thumbnail, which is an reduced image in size of an image included in each of the videos, on the screen of the television receiver 3. However, in Embodiment 4, a thumbnail of the limited video is also displayed without depending on time period.

Figure 12:
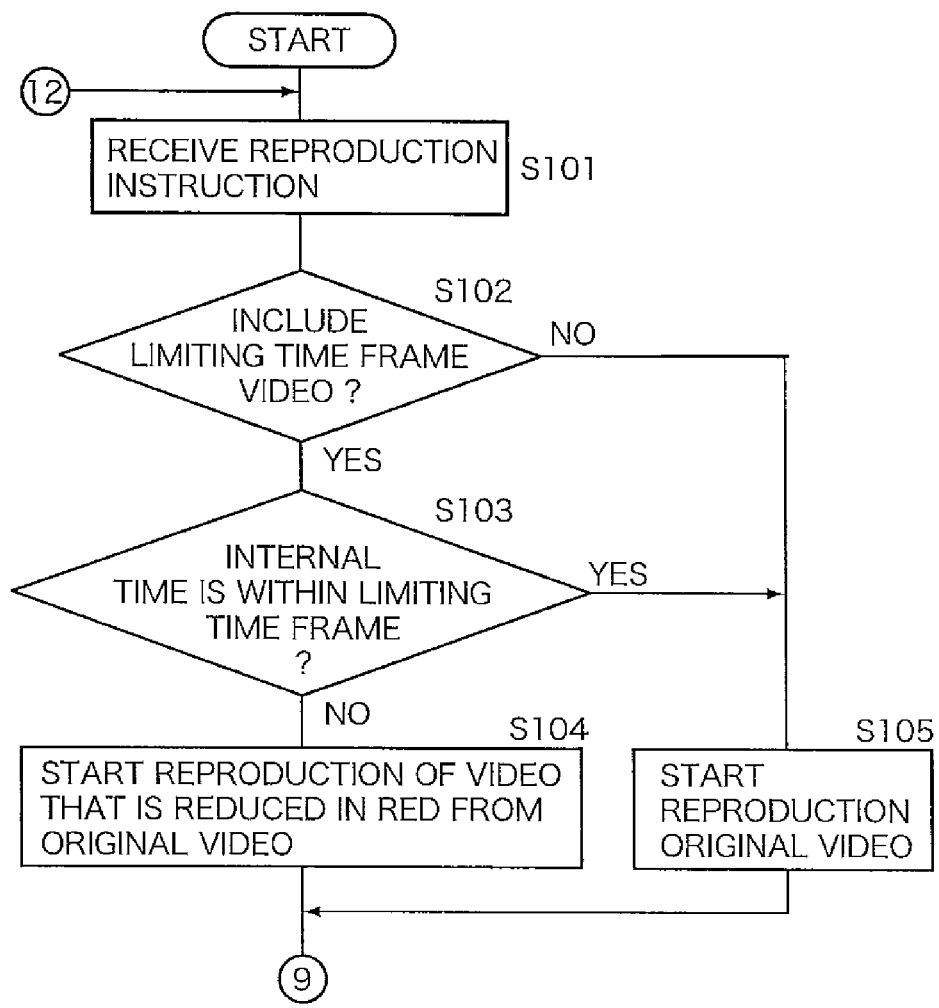
FIG. 12 A flowchart showing, together with FIG. 13 and FIG. 14, a processing procedure when the video reproducing apparatus according to Embodiment 4 reproduces a video.
Figure 13:
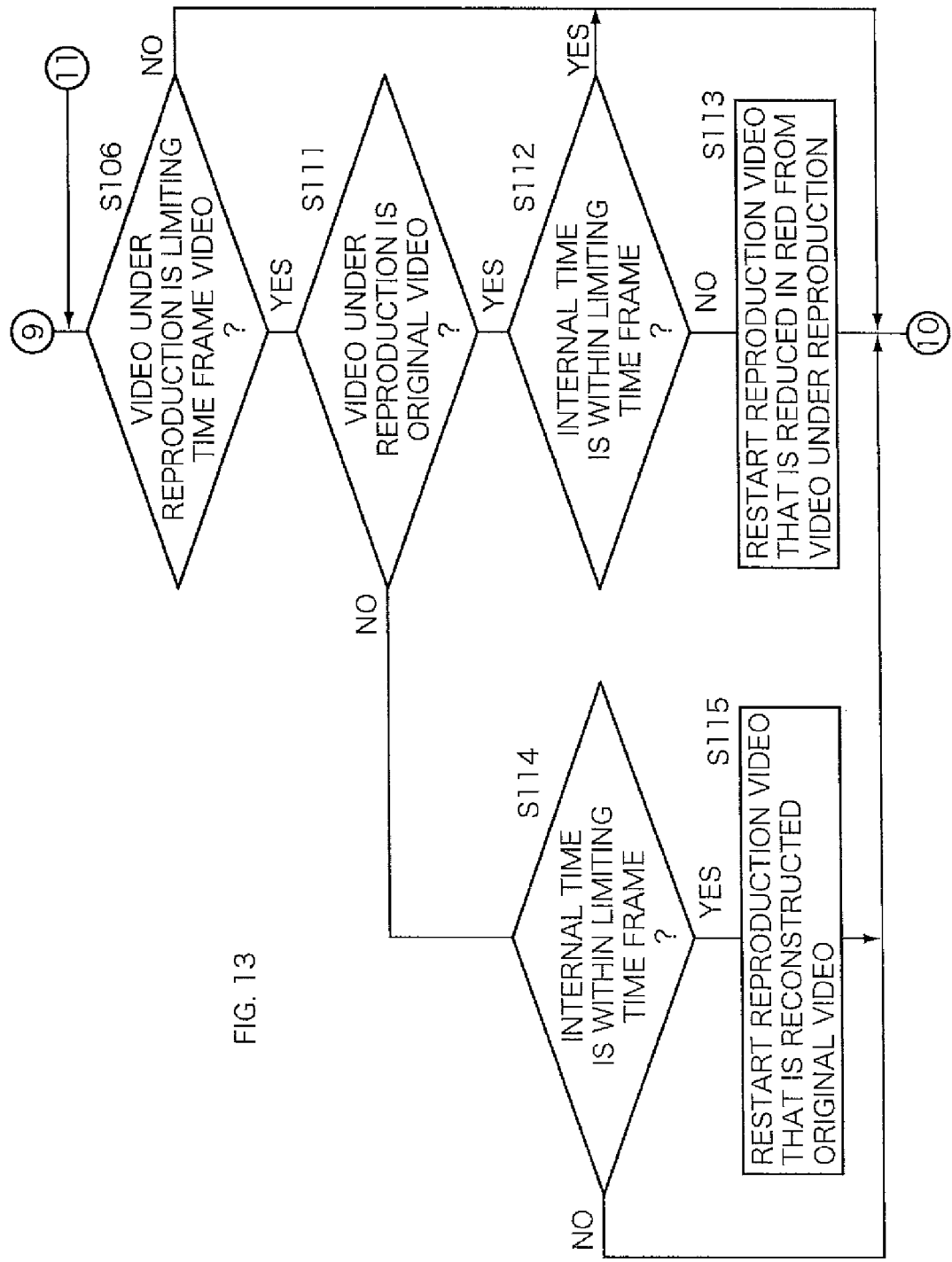
FIG. 13 A flowchart showing, together with FIG. 12 and FIG. 14, the processing procedure when the video reproducing apparatus according to Embodiment 4 reproduces the video.
Figure 14:
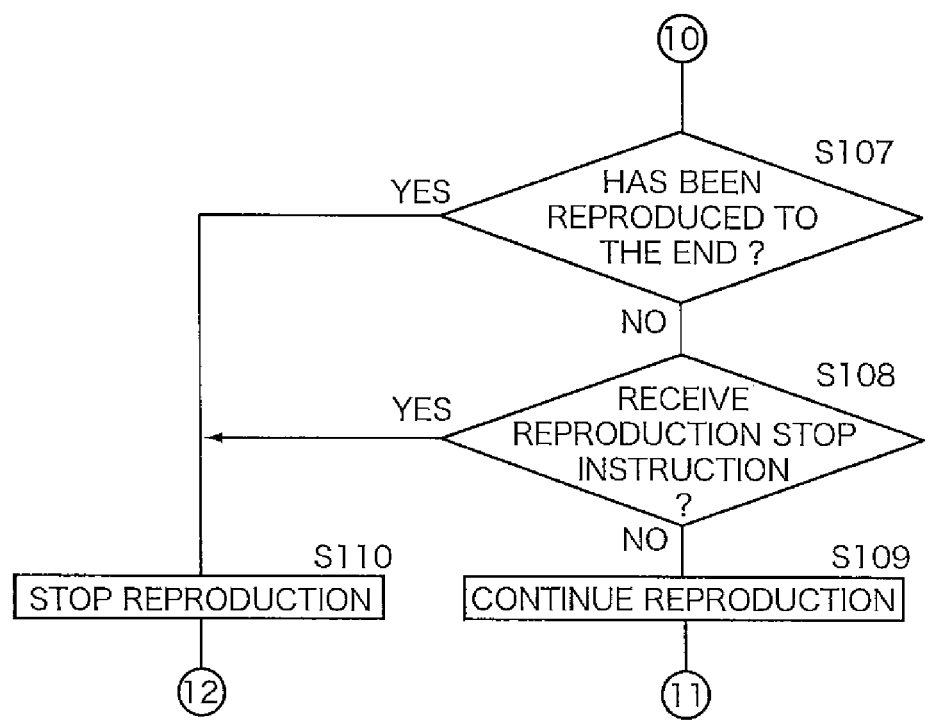
FIG. 14 A flowchart showing, together with FIG. 12 and FIG. 13, the processing procedure when the video reproducing apparatus according to Embodiment 4 reproduces the video.

FIG. 12, FIG. 13 and FIG. 14 are flowcharts showing a processing procedure when the video reproducing apparatus 1 according to Embodiment 4 reproduces a video, and the control section 11 executes it according to a control program stored in the ROM 13.

The control section 11 of the video reproducing apparatus 1 accepts a reproduction instruction specifying a video to be reproduced among two or more videos whose thumbnails are displayed on the screen of the television receiver 3, by the user operating the operating section 16 or the remote controller (S101). Upon this point, as mentioned above, thumbnails of the limited videos are also displayed regardless of time period. Further, the reproduction instruction is given to the video reproducing apparatus 1 by the user operating the operating section 16 or the remote controller. The control sections 11 then determines whether a recording start clock time of the video to be reproduced is included in the limiting time period stored in the RAM 12, that is, whether the video is a limiting time period video (S102). When it is determined that the video is a limiting time period video (S102: YES), the control section 11 then determines whether the internal clock time is within the limiting time period (S103). When it is determined that the internal clock time is not within the limiting time period (S103: NO), the control section 11 causes the drive section 22 to read out data of the video instructed for reproduction from a recording medium, and causes the signal processing section 21 to perform a signal processing to reduce a red component from the read-out data and output it from the output section 24 to the television receiver 3. Thereby, the video reproducing apparatus 1 causes the television receiver 3 to start reproduction of the video that is reduced in red contained in an original video (S104).

In Step S102, when the recording start clock time of the video to be reproduced is not included in the limiting time period, that is, when it is determined not to be a limiting time period video (S102: NO), or in Step S103, when it is determined that the internal clock time is within the limiting time period (S103: YES), the control section 11 starts reproduction of the video (an original video, red of which is not reduced) instructed for reproduction by reproducing the video on the screen of the television receiver 3 as it is (S105).

The control section 11 repeatedly executes the following process until the reproduction of the video is finished after the reproduction of the video has been started in Step S104 or S105. First, the control section 11 determines whether the video under reproduction is a limiting time period video (S106). When the video under reproduction is not a limiting time period video (S106: NO), the control section 11 determines whether the video under reproduction has been reproduced to the end (S107), and whether it has accepted a reproduction stop instruction by the user operating the operating section 16 and the remote controller (S108). When the reproduction of the video under reproduction has not been performed to the end (S107: NO), and when the reproduction stop instruction has not been accepted (S108: NO), the control section 11 returns the process to Step S106 to repeat a similar process as mentioned above, while continuing the reproduction of the video (in this case, the original video, red of which is not reduced) under reproduction (S109). When the reproduction of the video (in this case, the original video) under reproduction has been performed to the end (S107: YES), or when the reproduction stop instruction has been accepted (S108: YES), the control section 11 stops the reproduction of the video (S110), and returns the process to Step S101. Therefore, when reproduction of a video that is not a limiting time period video has been started, the video will be reproduced to the end unless the user instructs a stop for the reproduction.

When the video under reproduction is a limiting time period video (S106: YES), the control section 11 determines whether the video under reproduction is an original video (S111). When the video under reproduction is the original video (S111: YES), the control section 11 then determines whether the internal clock time is within the limiting time period (S112). When it is determined that the internal clock time is within the limiting time period (S112: YES), the control section 11 proceeds the process to Step S107, and performs a similar process to the case where the video under reproduction is not a limiting time period video, as mentioned above.

However, when it is determined that the internal clock time is not within the limiting time period (S112: NO), specifically, when the internal clock time shifts from inside the limiting time period (S112: YES) to outside the limiting time period (S112: NO) during the reproduction of the limiting time period video, the control section 11 restarts reproduction of the limiting time period video while reducing in red, although the limiting time period video has been reproduced till then by the original video (S113).

Thus, after the reproduction of the limiting time period video reduced in red has been started, the control section 11 repeatedly executes the following process until the reproduction of the video is finished. First, the control section 11 determines whether the video (a video reduced in red from the limiting time period video) under reproduction has been reproduced to the end (S107), and whether it has accepted a reproduction stop instruction by the user operating the operating section 16 and the remote controller (S108). When it is determined that the reproduction of the video reduced in red under reproduction is not performed to the end (S107: NO), and when the reproduction stop instruction has not been accepted (S108: NO), the control section 11 returns the process to Step S106 and repeats a similar process as mentioned above while continuing the reproduction of the video reduced in red (S109). When the video under reproduction reduced in red has been reproduced to the end (S107: YES), or when the reproduction stop instruction has been accepted (S108: YES), the control section 11 stops the reproduction of the video reduced in red (S110), and returns the process to Step S101.

Therefore, when the limiting time period has passed after the reproduction of the limiting time period video was started during the limiting time period as an original video, the video will be reproduced to the end in a state where red is reduced unless the user instructs a stop for the reproduction.

On the other hand, when the video under reproduction is a limiting time period video but not an original video, that is, when the limiting time period video has been reproduced in a state where red is reduced (S106: YES, and S111: NO), the control section 11 then determines whether the internal clock time is within the limiting time period (S114). When it is determined that the internal clock time is not within the limiting time period (S114: NO), the control section 11 proceeds the process to Step S107, and performs a similar process as mentioned above.

However, when it is determined that the internal clock time is within the limiting time period (S114: YES), specifically, when the internal clock time shifts from outside the limiting time period (S114: NO) to inside the limiting time period (S114: YES) while being reproduced in a state where red is reduced, the control section 11 restores the video to the original video, that has been reproduced while being reduced in red till then, and restarts reproduction (S115). After this, the control section 11 proceeds the process to Step S107, and performs a similar process as mentioned above.

Therefore, when it shifts within the limiting time period after the reproduction of the limiting time period video was started in a state where red was reduced during a time period other than the limiting time period, after that, the video will be reproduced to the end in a state of its original video unless the user instructs a stop for the reproduction.

As mentioned above, also in Embodiment 4, similar to the case of Embodiment 3, by reducing red of a video that is likely a limited video (a limiting time period video) whose recording start clock time is included in the limiting time period, influence of the video on a viewer may be reduced. Therefore, in Embodiment 4, when a video (a limiting time period video) recorded during the limiting time period during which the limited video may be broadcasted is reproduced, by degrading an image quality of the video, it is possible to reduce the influence on a viewer not satisfying the view allowance condition, such as a young person who needs to be limited in viewing the limited video though the limited video is reproduced by mistake during a time period other than the limiting time period.

In the meantime, in Embodiment 4, similar to Embodiment 3 as mentioned above, although an aspect using a method of reducing red contained in a video as a method of degrading the image quality of the video that is likely a limited video (a limiting time period video) has been shown, it may not be limited thereto. As other methods, when the video reproducing apparatus 1 according to the invention reproduces a video during a time period other than the reproducible time period, a process of degrading the video using the other methods, such as, converting the video into monochrome, or applying mosaic to the video, for example, may be performed.

INDUSTRIAL APPLICABILITY

In the meantime, although an example in which a video is reproduced on a screen of a television receiver has been explained in each of the above-mentioned Embodiments, a configuration in which the video reproducing apparatus according to the present invention itself includes a monitor and a speaker may also be possible, and further, of course, it may also be possible to apply the present invention to a personal computer system including the monitor and speaker.

Further, although a video (a TV program) categorized as PG-13 (Parental Guidance 13th) is illustrated in the above-mentioned Embodiments as a video to be limited in viewing by a viewer not satisfying a view allowance condition to view a limited video (a specific video), it may not be limited thereto.

The invention claimed is:

1. A video reproduction limiting method of limiting reproduction of a limited video needed to be limited in viewing by a viewer not satisfying a condition to view a specific video using a video reproducing apparatus for reproducing a recorded video comprising:
   setting a limiting time period of a day as a time period limited in viewing by the viewer;
   recording a limited video during the set limited time period;
   allowing, during the same time period as the set limited time period on another day, the video reproducing apparatus to reproduce the limited video recorded during the set limited time period; and inhibiting reproduction of the limited video by the video reproducing apparatus during a time period other than the set limiting time period.

2. A video reproducing apparatus including a reproducing section for reproducing a video recorded in a recording medium for recording a broadcasted video and a stored recording start clock time of the video, wherein the video reproducing apparatus setting a limiting time period of a day as a time period limited in viewing by the viewer;

the recording medium recording a limited video during the set limited time period;

the video reproducing apparatus allowing, during the limited time period on another day, the reproducing section to reproduce the limited video recorded during the set limited time period, the limited video being needed to be limited in viewing by a viewer not satisfying a condition to view a specific video among videos recorded in the recording medium, and inhibiting the reproducing section from reproducing the limited video during a time period other than the set limiting time period.

3. The video reproducing apparatus as set forth in claim 2, including a recording section for recording a broadcasted video, and a reproducing section for reproducing the video recorded by the recording section, the video reproducing apparatus comprising:

an operating section for setting a specific limiting time period of a day; and the video reproducing apparatus allowing the reproducing section to reproduce the video during the limiting time period, the video being recorded by the recording section during the limiting time period, and inhibiting the reproducing section from reproducing the video during a time period other than the limiting time period.

4. The video reproducing apparatus as set forth in claim 3, comprising:

a content information output section for outputting content information indicative of content of one or more videos recorded by the recording section; and the video reproducing apparatus allowing the content information output section to output the content information of the video during the limiting time period, the video being recorded by the recording section during the limiting time period, and inhibiting the content information output section from outputting the content information of the video during a time period other than the limiting time period.

5. The video reproducing apparatus as set forth in claim 2, further comprising:

a clock for clocking a time;

an external clock time information receiving section for receiving external clock time information indicative any one of an exterior clock time; and the control section synchronizing the clock time clocked by the clock with the clock time indicated by the external clock time information received by the external clock time information receiving section.

6. A video reproducing apparatus including a recording section for recording a broadcasted video, a recording medium for recording a stored recording start clock time of the video, and a reproducing section for reproducing the video recorded by the recording section, wherein the video reproducing apparatus setting a limiting time period of a day as a time period limited in viewing by the viewer;

the recording medium recording a limited video during the set limited time period;

the video reproducing apparatus allowing, during the set limited time period on another day, the reproducing section to reproduce the limited video recorded during the set limited time period, the limited video being needed to be limited in viewing by a viewer not satisfying a condition to view a specific video among videos recorded in the recording medium, and inhibiting the reproducing section from reproducing the limited video during a time period other than the set limiting time period.

7. The video reproducing apparatus as set forth in claim 6, comprising:

a content information output section for outputting content information indicative of content of one or more videos recorded by the recording section; and the video reproducing apparatus allowing the content information output section to output the content information of the limited video during a time period from the recording start clock time of the limited video recorded by the recording section to the predetermined clock time, and inhibiting the content information output section from outputting the content information of the limited video during a time period other than the time period based on the recording start clock time.

8. The video reproducing apparatus as set forth in claim 7, comprising:

the video reproducing apparatus causing the recording section to record other video while recording the limited video, the other video being broadcasted in parallel with the limited video on another channel other than a channel on which the limited video is broadcasted, upon recording the limited video being broadcasted; and the video reproducing apparatus causing the content information output section to output the content information of the other video during a time period other than the time period from the recording start clock time of the limited video to the predetermined clock time, the limited video being recorded by the recording section, and the other video being recorded by the recording section together with the limited video.

9. The video reproducing apparatus as set forth in claim 8, wherein the recording section is configured to record a video on a predetermined recording medium after encoding the video; and the video reproducing apparatus further causing the recording section to encode the other video by a compression ratio higher than a compression ratio by which the limited video is encoded.

10. The video reproducing apparatus as set forth in claim 6, including a recording section for recording a broadcasted video, a recording medium for recording a stored recording start clock time of the video, and a reproducing section for reproducing the video recorded by the recording section, the video reproducing apparatus comprising:

the video reproducing apparatus causing the reproducing section to reproduce a video that is a degraded video of a limited video in an image quality during a time period other than time period from the recording start clock time of the limited video to the predetermined clock time, the limited video being needed to be limited in viewing by a viewer not satisfying a view allowance condition to view a specific video among videos recorded by the recording section.

11. The video reproducing apparatus as set forth in claim 6, including a recording section for recording a broadcasted video, and a reproducing section for reproducing the video recorded by the recording section, the video reproducing apparatus comprising:
- an operating section for setting a specific limiting time period of a day; and
- the control section causing the reproducing section to reproduce a degraded video during a time period other than the limiting time period, wherein the degraded video is a degraded video of the video in an image quality that is recorded by the recording section during the limiting time period.

12. The video reproducing apparatus as set forth in claim 6, further comprising:
- a clock for clocking a time;
- an external clock time information receiving section for receiving external clock time information indicative of an exterior clock time; and
- the control section synchronizing the clock time clocked by the clock with the clock time indicated by the external clock time information received by the external clock time information receiving section.

* * * * *